United States Patent
Schiele et al.

(10) Patent No.: US 7,410,338 B2
(45) Date of Patent: Aug. 12, 2008

(54) EXOSKELETON FOR THE HUMAN ARM, IN PARTICULAR FOR SPACE APPLICATIONS

(75) Inventors: André Schiele, Leiden (NL); Gianfranco Visentin, Oegstgeest (NL)

(73) Assignee: Organisation Intergouvernementale Dite Agence Spatiale Europeenne, Cedex (FR)

( * ) Notice: Subject to any disclaimer, the term of this patent is extended or adjusted under 35 U.S.C. 154(b) by 0 days.

(21) Appl. No.: 10/443,111

(22) Filed: May 22, 2003

(65) Prior Publication Data

US 2003/0223844 A1    Dec. 4, 2003

(30) Foreign Application Priority Data

May 22, 2002 (FR) .................................. 02 06253

(51) Int. Cl.
    B25J 3/00    (2006.01)
(52) U.S. Cl. ............................... 414/4; 700/245
(58) Field of Classification Search .................. 414/5, 414/4; 345/156; 700/245, 264; 340/407.1; 318/568.16; 74/471 XY
See application file for complete search history.

(56) References Cited

U.S. PATENT DOCUMENTS

| | | | |
|---|---|---|---|
| 4,180,870 A | | 1/1980 | Wolfer et al. |
| 4,575,297 A | * | 3/1986 | Richter ........................ 414/5 |
| 6,059,506 A | * | 5/2000 | Kramer ....................... 414/5 |
| 6,104,379 A | * | 8/2000 | Petrich et al. ............... 345/157 |
| 6,477,448 B1 | * | 11/2002 | Maruyama ................... 700/302 |

FOREIGN PATENT DOCUMENTS

WO    WO 95 32842 A    12/1995

OTHER PUBLICATIONS

Bergamasco M. et al.: An Arm Exoskeleton System for Teleoperation and Virtual Environments Applications Robtotics and Automation, 1994, Proceedings IEEE Int'l Conference in SanDiego, CA, May 8-13, 1994, Lost Alamitos, CA, USA, IEEE Comput. Soc. May 8, 1994, pp. 1449-1454, XP010097703, ISBN 0-8186-5330-2, Abstract, Figs. 1,2, p. 1450, col. 2, last par. to p. 1451, col. 2, par. 1.

(Continued)

Primary Examiner—Donald Underwood
(74) Attorney, Agent, or Firm—Miles & Stockbridge P.C.

(57) ABSTRACT

The invention relates to an arm exoskeleton comprising a moving system of joints placed in parallel with the joints of the human arm, the exoskeleton comprising a shoulder exoskeleton, an elbow exoskeleton, and a wrist exoskeleton. In all, the exoskeleton has sixteen joints providing sixteen degrees of freedom. A support worn on the torso of a human operator comprises a rigid front plate and a rigid back plate. The shoulder exoskeleton has its proximal end fixed to the front plate, whereby the front plate provides a fixed reference for all movements of the exoskeleton, and the wrist exoskeleton is fixed to a rigid glove worn on the hand of the operator. Active joints are controlled by flexible cable tendons bridging the exoskeleton, said tendons themselves being actuated by control units disposed on the rigid back plate. Inflatable cushions prevent the wrist exoskeleton and the shoulder exoskeleton from moving relative to the arm of the operator. The invention is applicable in particular to remotely controlling a robot in space.

26 Claims, 19 Drawing Sheets

OTHER PUBLICATIONS

Jau, B.M.: "A New Anthropomorphic Telerobot Servicer" Proceedings IEEE/RJS Int'l Workshop on Intelligent Robots & Systems, Sep. 4, 1989-Aug. 6, 1989, pp. 579-582, XP010257842,, Tsukuba, Japan, entire document.

Li L et al. "Dvelopment of a Telepresence Controlled Ambidextrous Robot for Space Applications", Robotics and Automation, 1996, Proceedings, IEEE Int'l Conf. in Minneapolis, MN, Apr. 22-28, 1996, NYNY, USA, IEEE, Apr. 22, 1996, pp. 58-63, XP010162730, ISBN: 0 703 2988-0 Entire document.

* cited by examiner

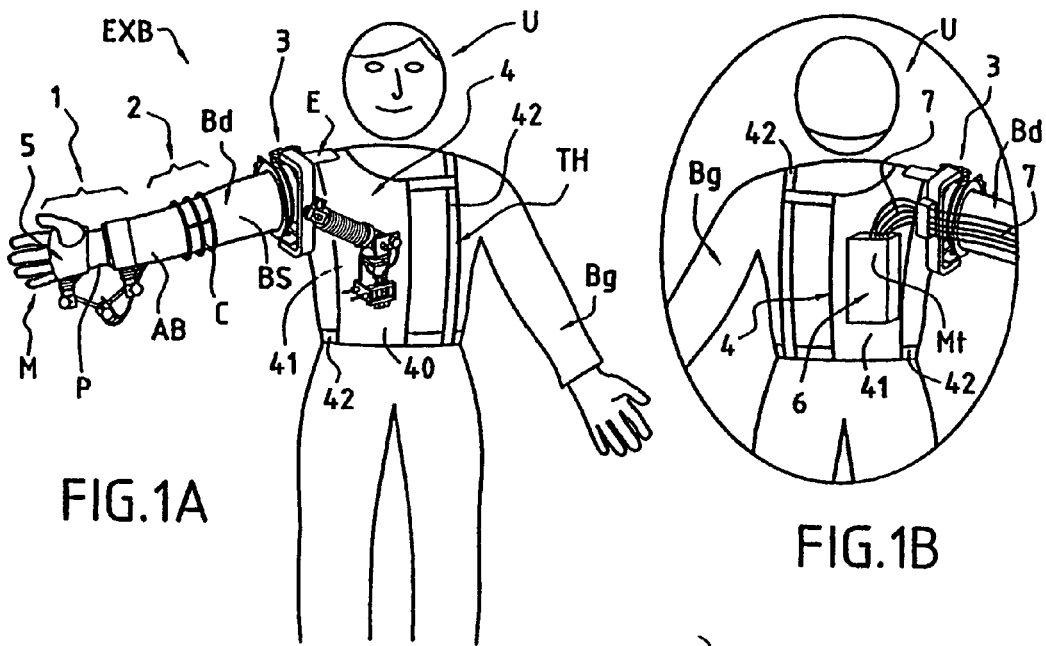
FIG.1A
FIG.1B
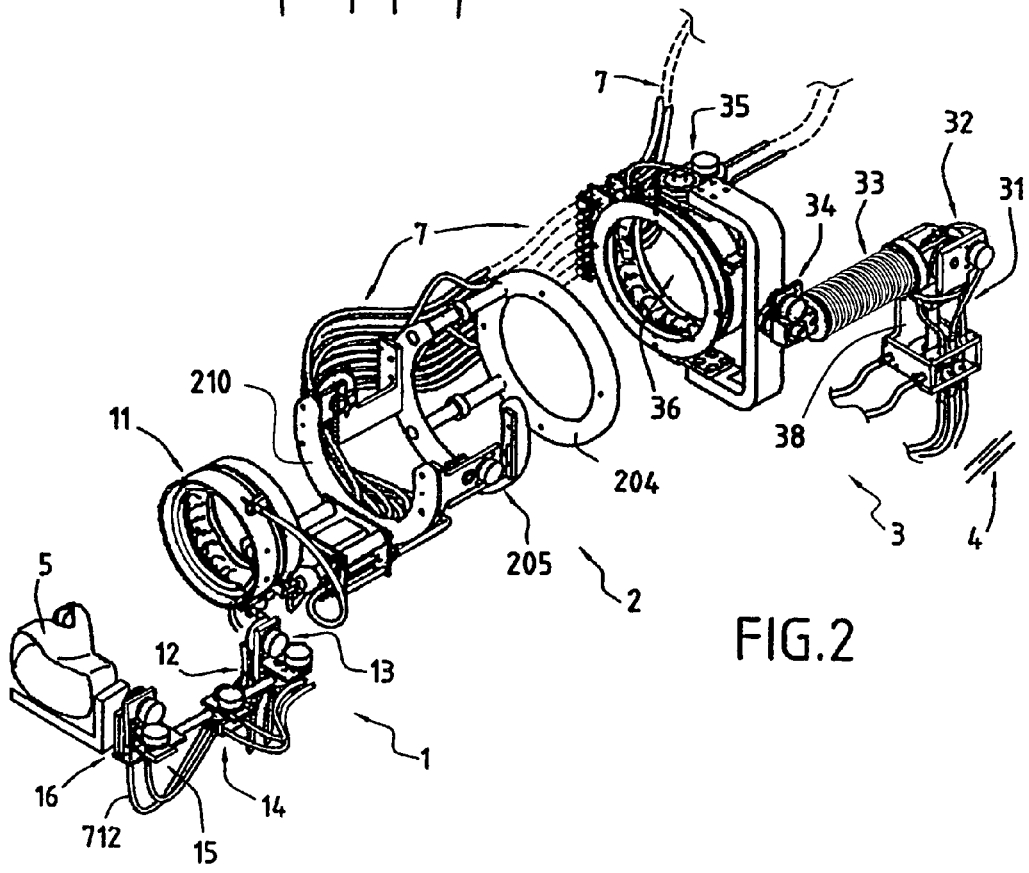
FIG.2

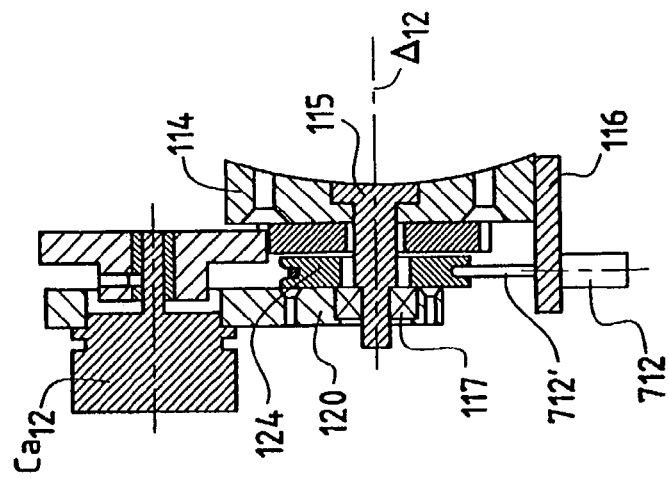
FIG.3C3 Section C/C
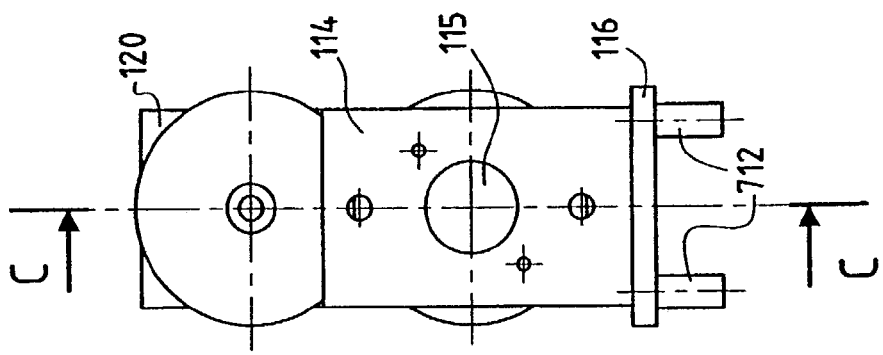
FIG.3C2
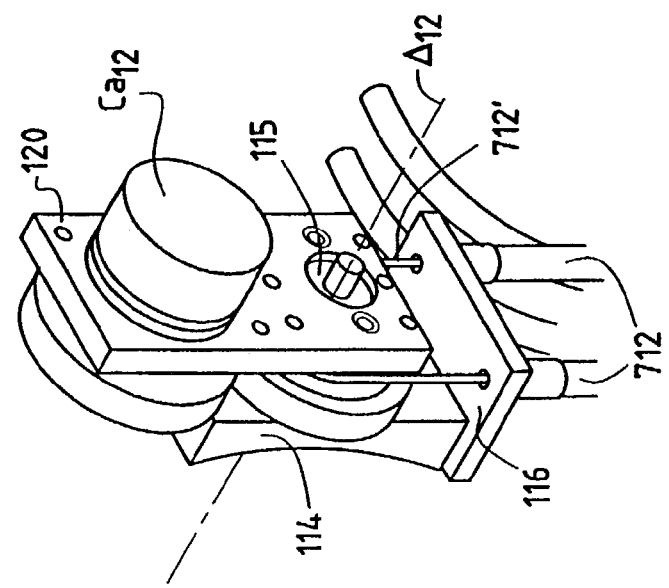
FIG.3C1

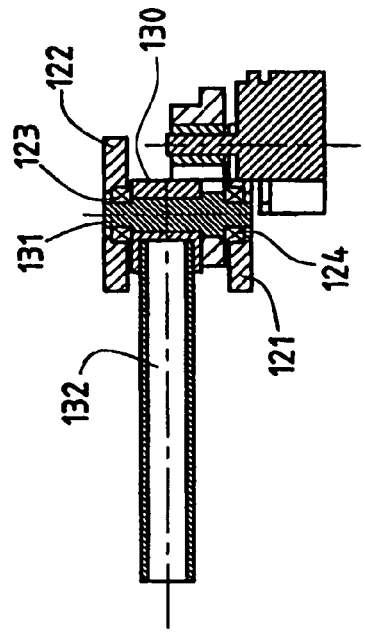
FIG.3D3 Section H/H
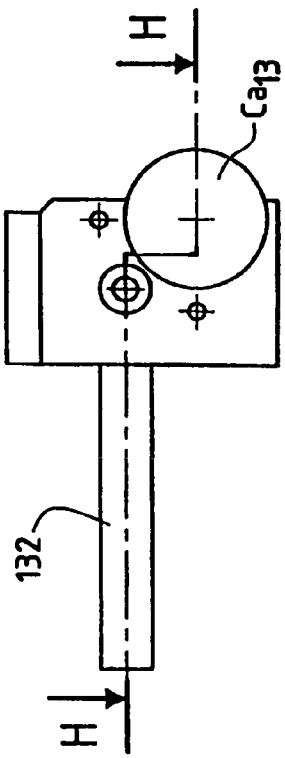
FIG.3D2
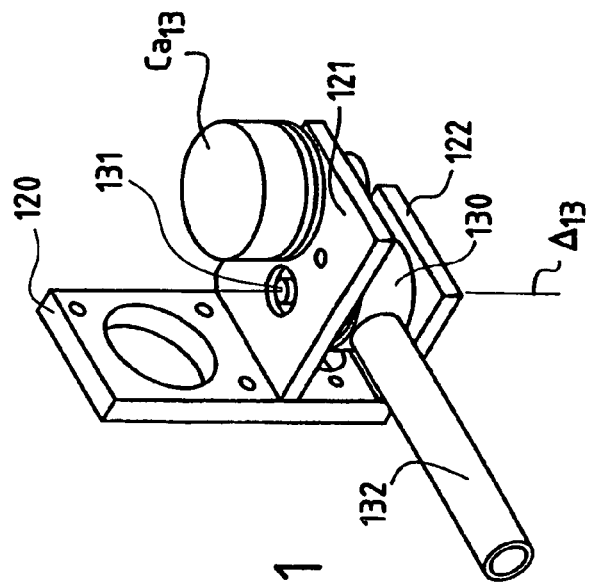
FIG.3D1

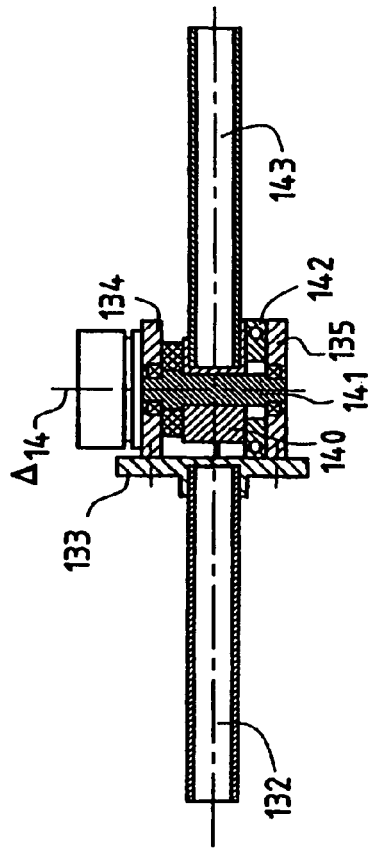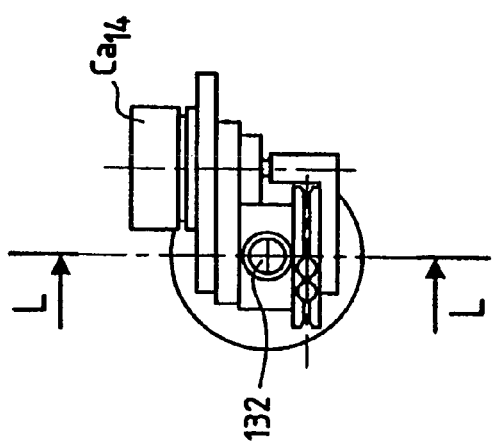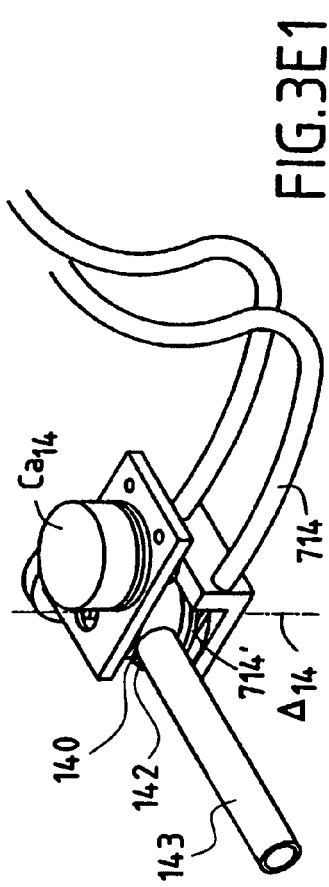

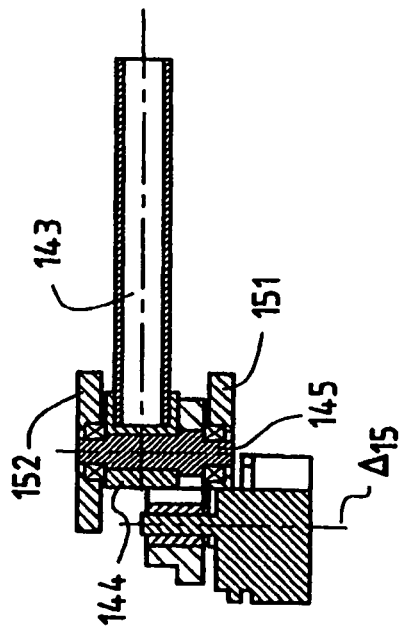
FIG.3F3 Section R/R
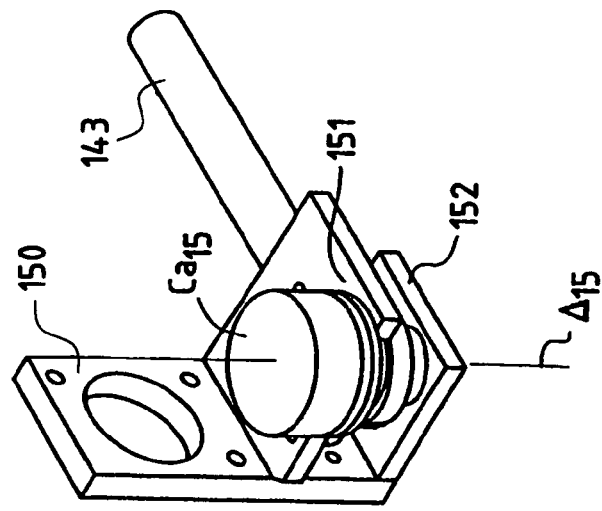
FIG.3F2
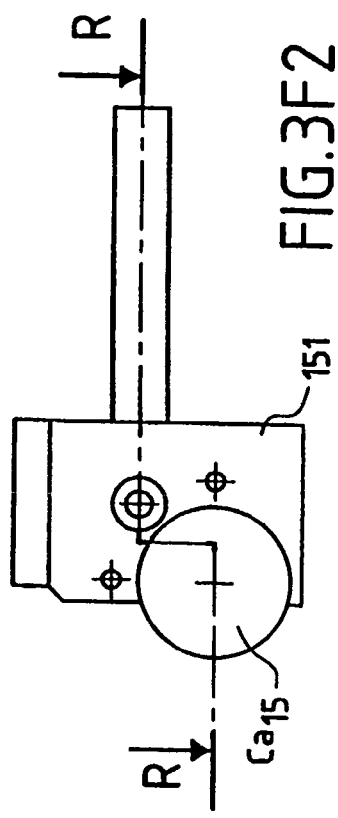
FIG.3F1

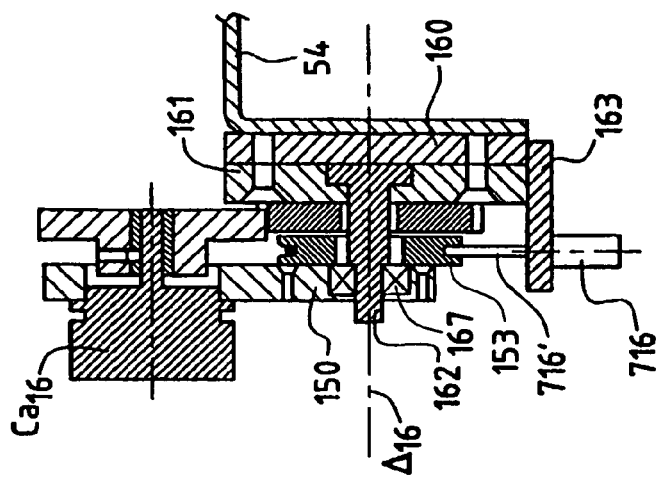
FIG.3G3 Section U/U
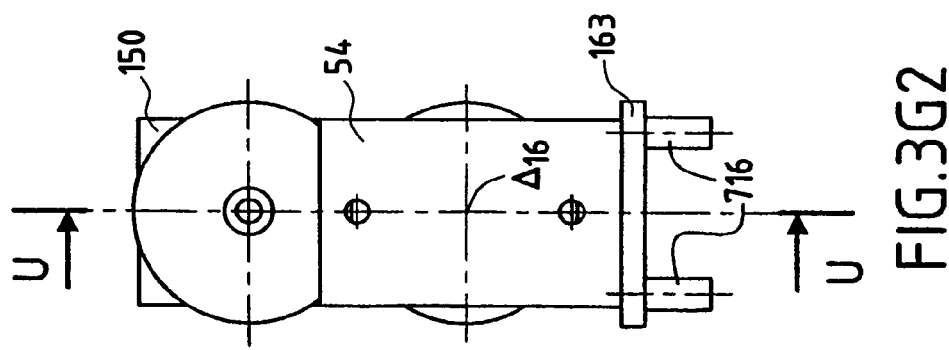
FIG.3G2
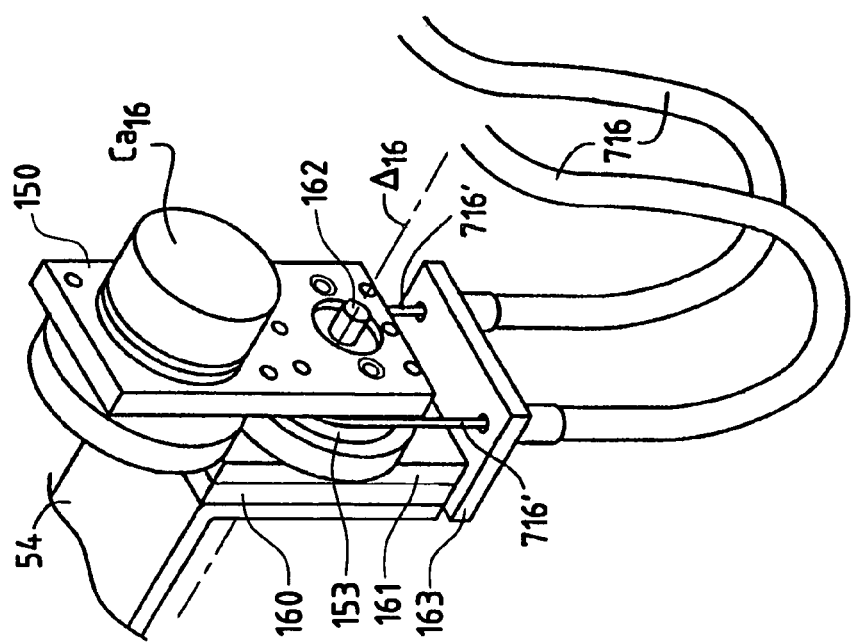
FIG.3G1

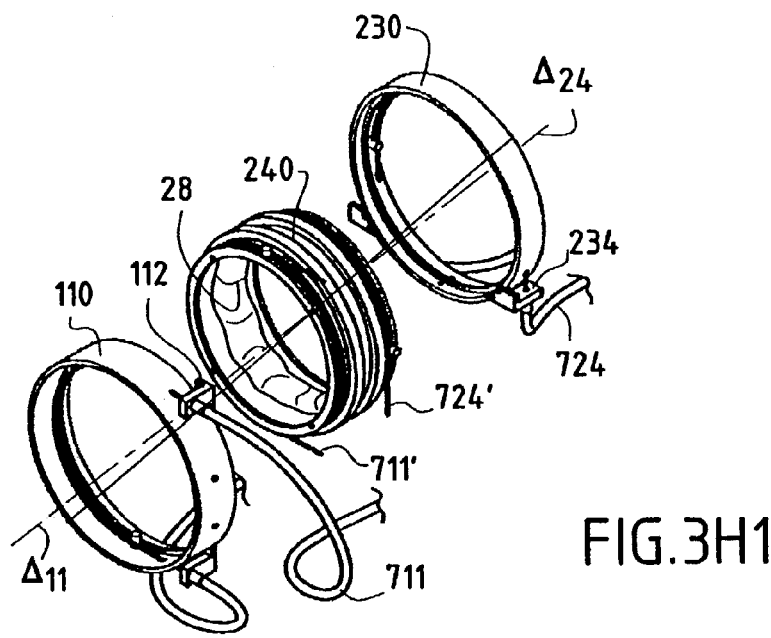
FIG.3H1
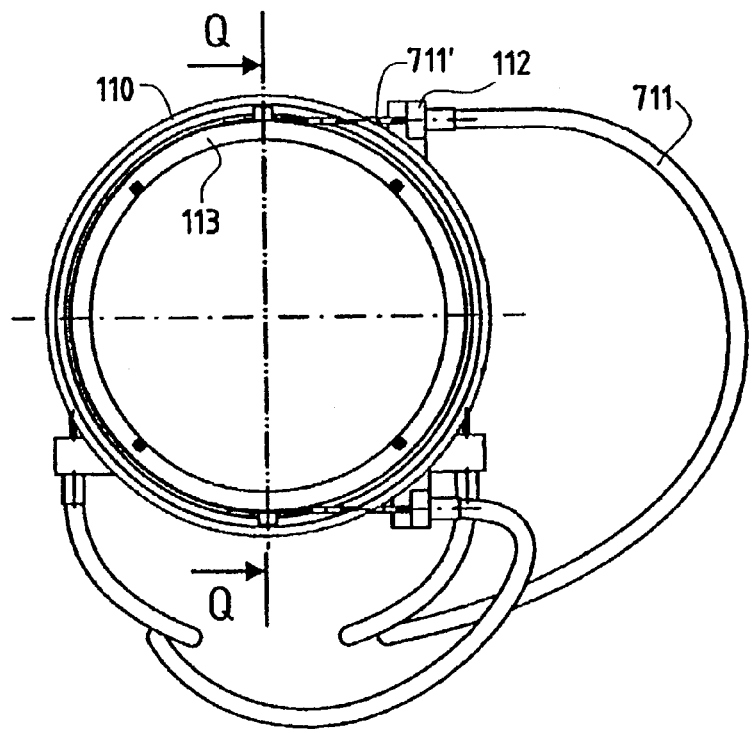
FIG.3H2
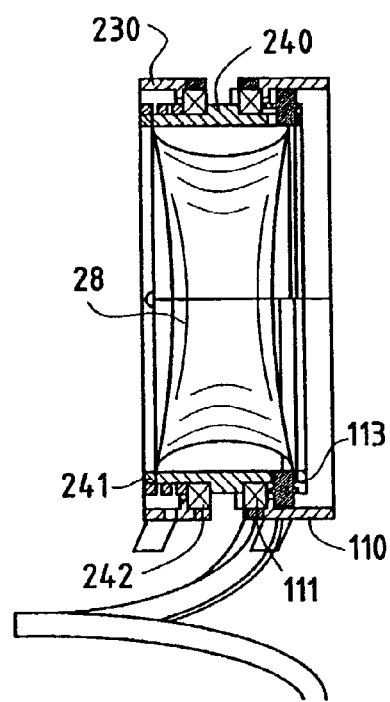
FIG.3H3
Section Q/Q

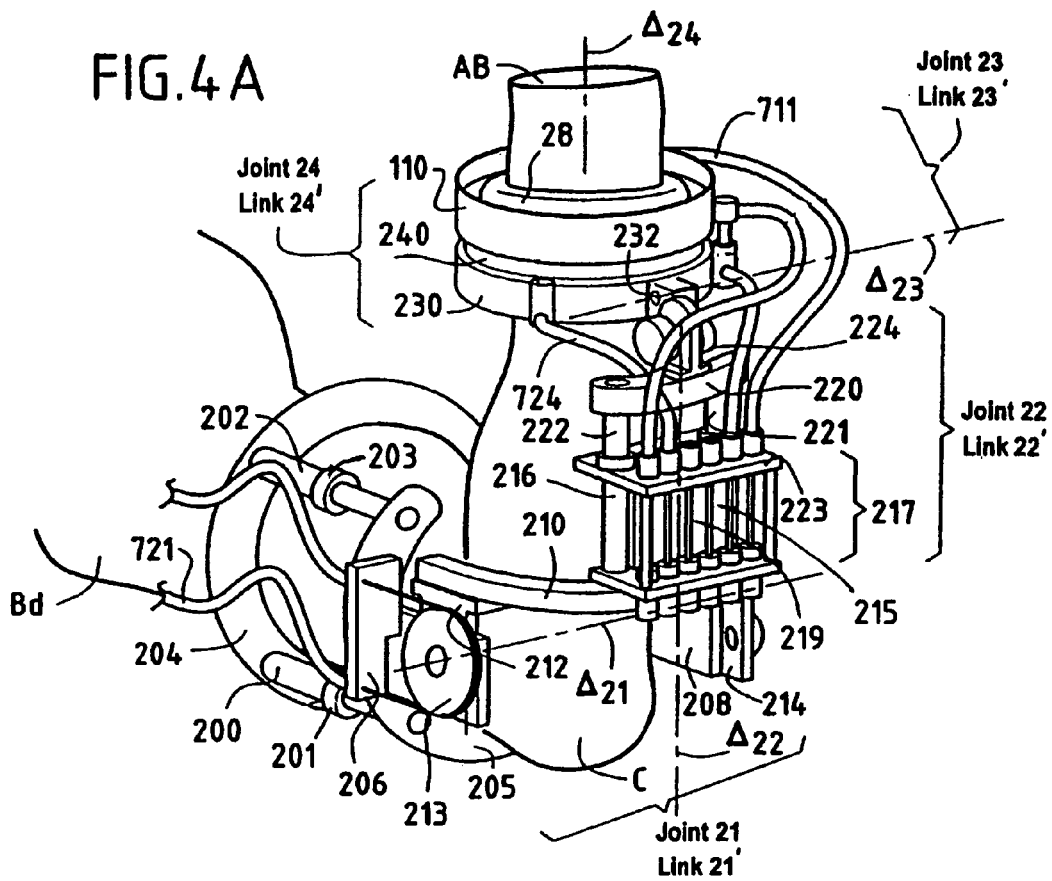
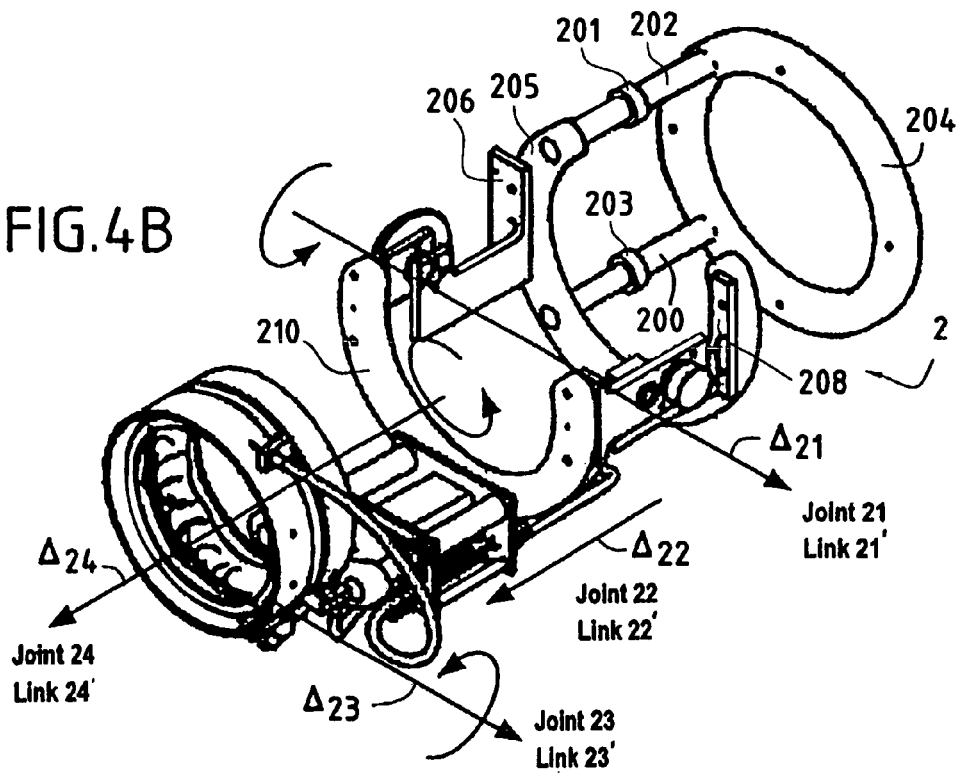

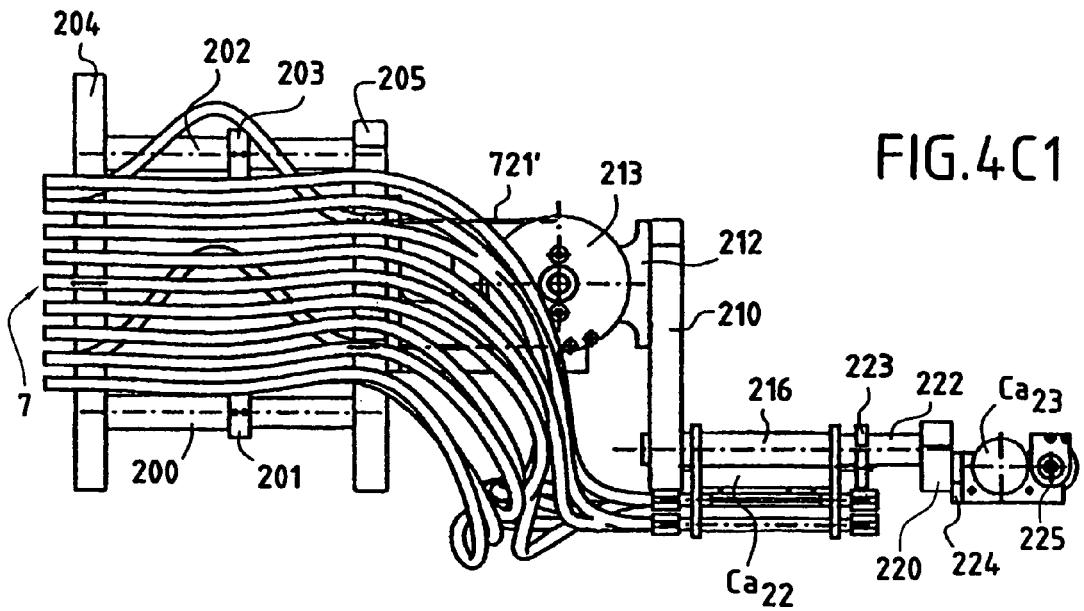
FIG.4C1
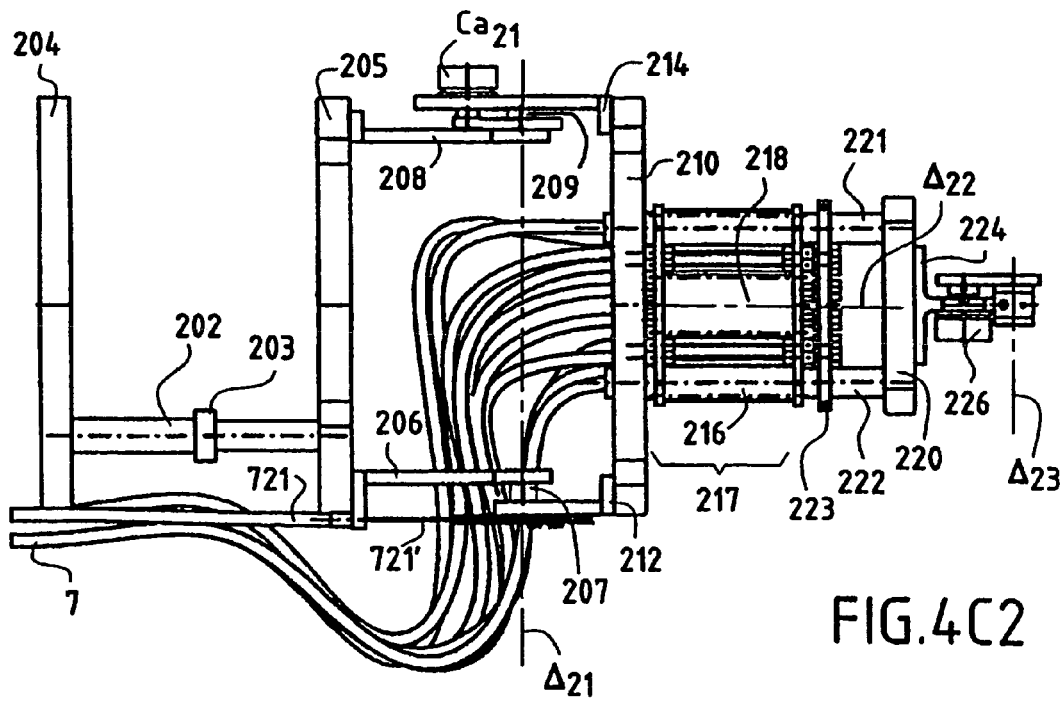
FIG.4C2

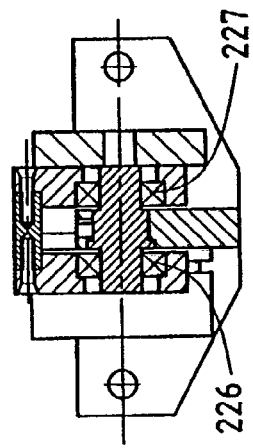
FIG.4D3 Section M/M
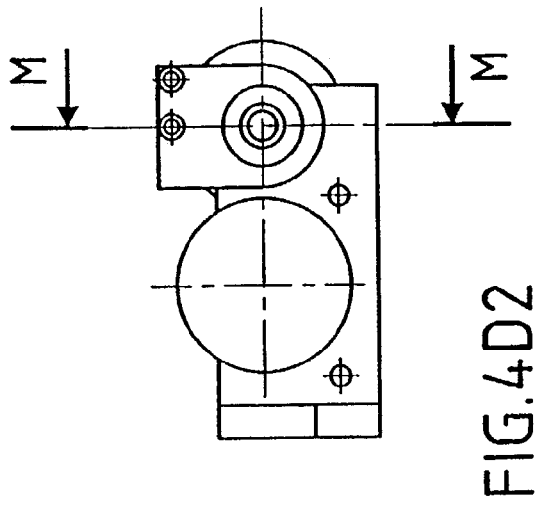
FIG.4D2
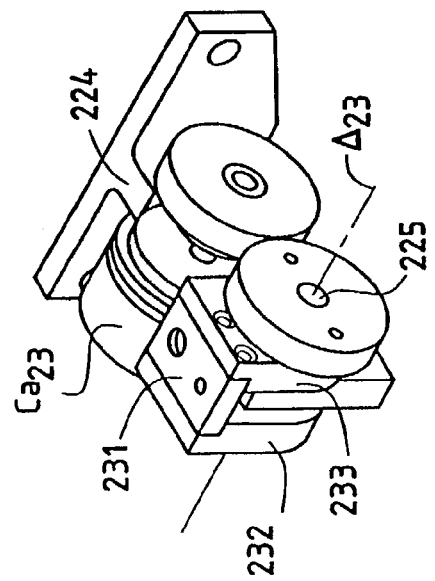
FIG.4D1

Pre-tension tendons

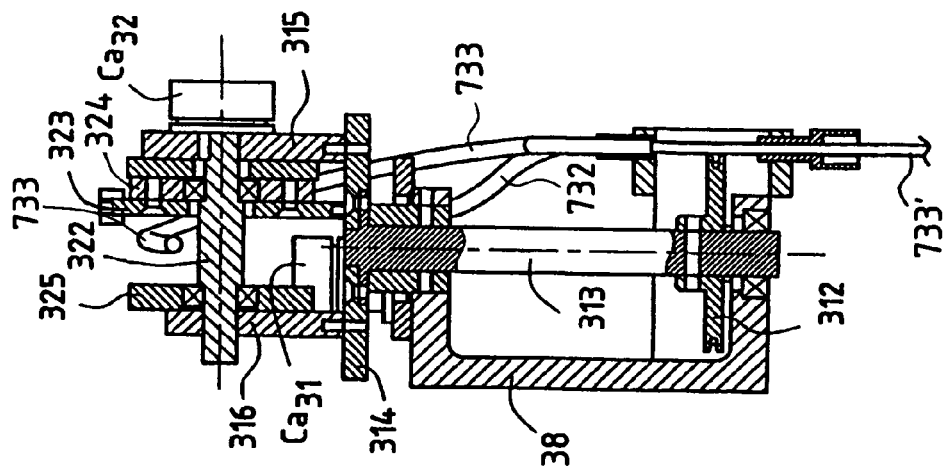
FIG.5E3 Section D/D
FIG.5E2
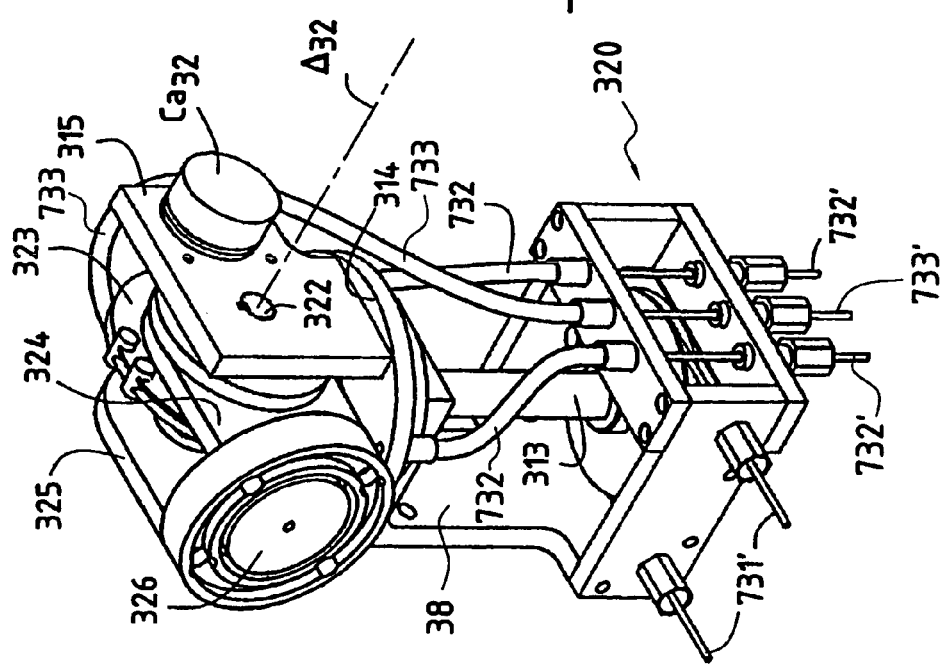
FIG.5E1

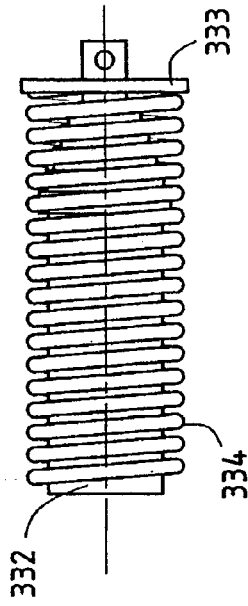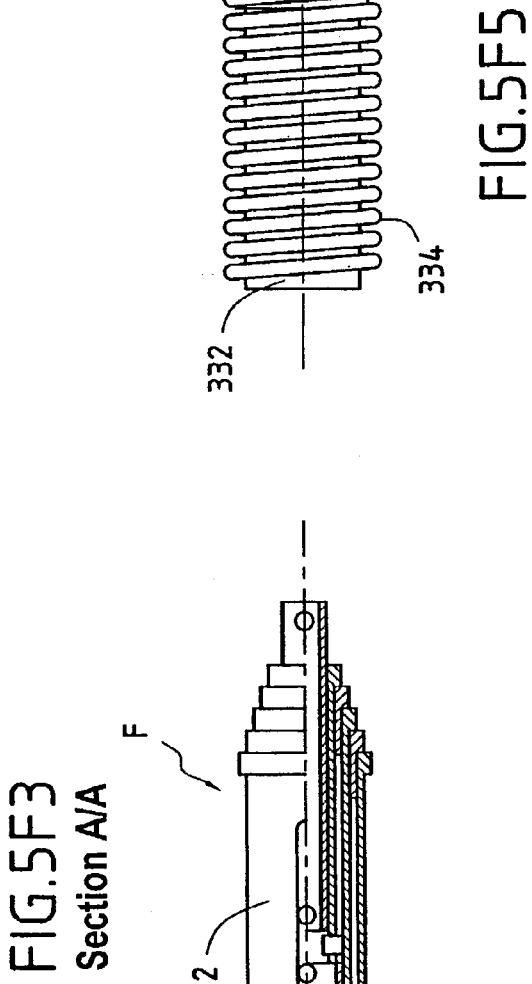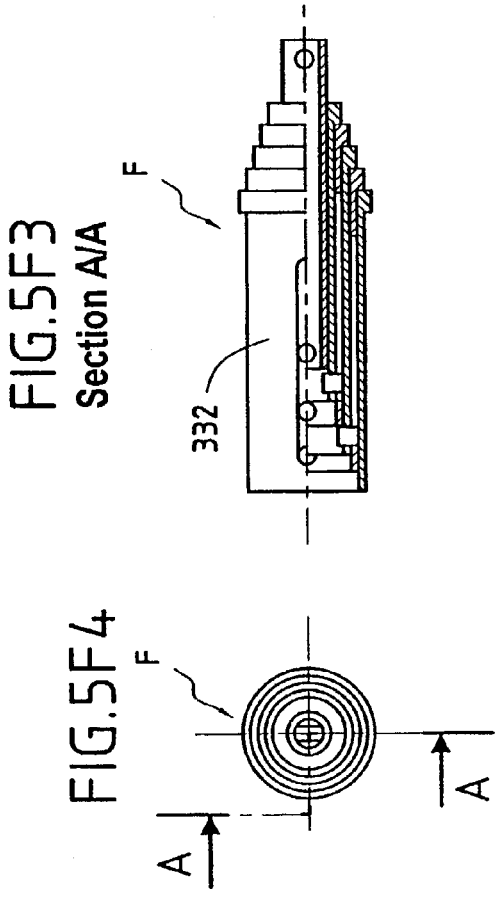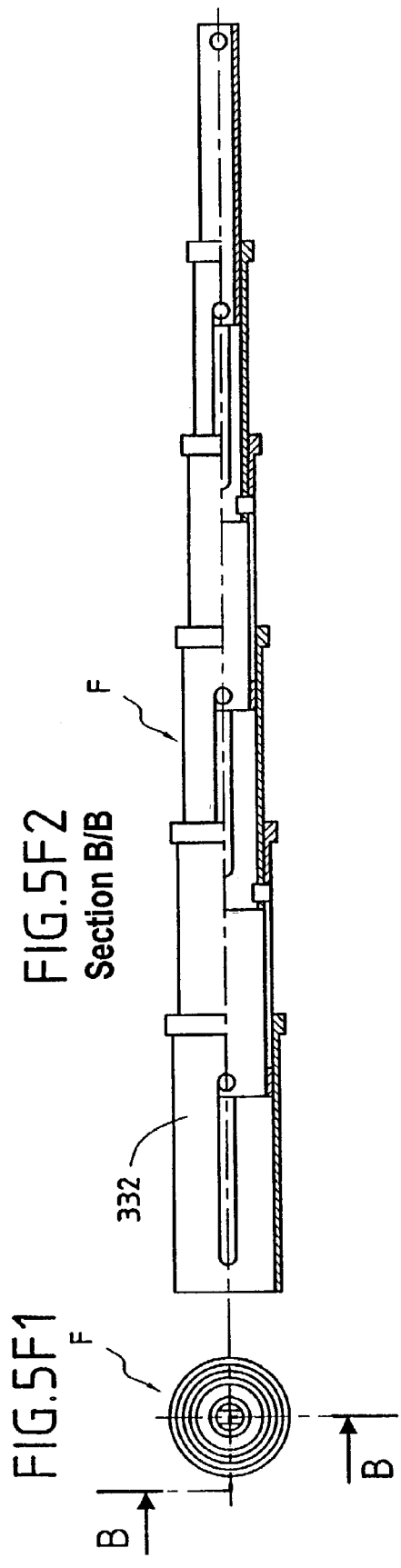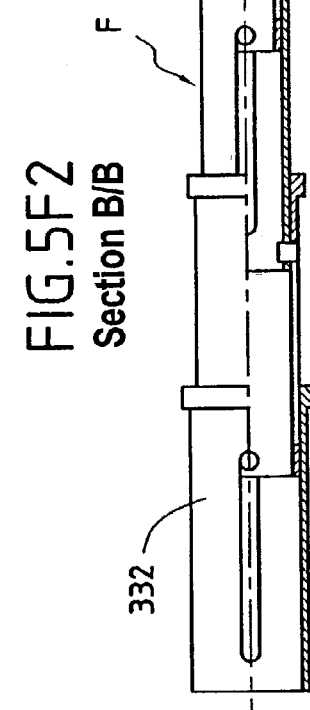

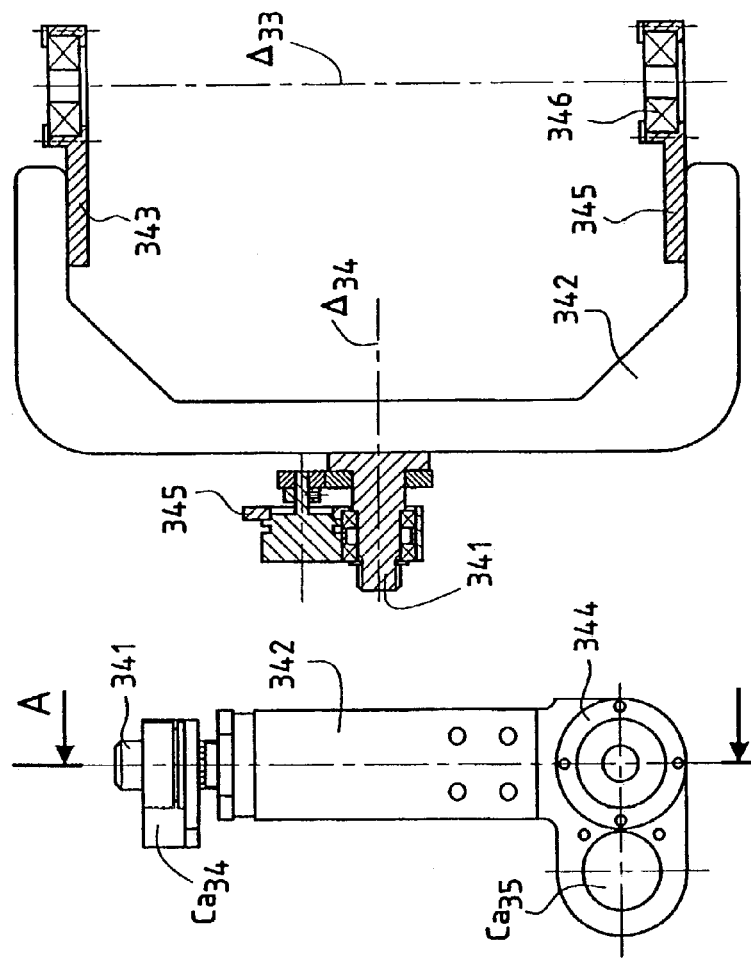
FIG.5G3 Section A/A
FIG.5G2
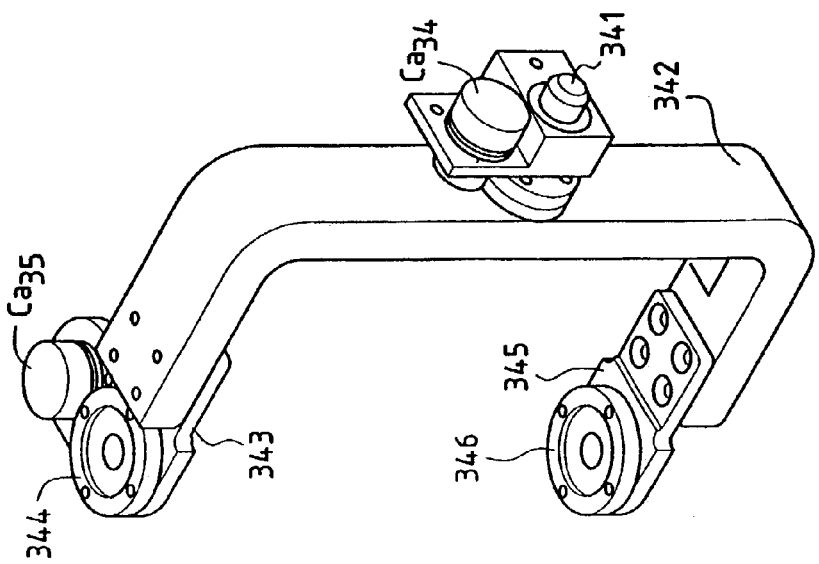
FIG.5G1

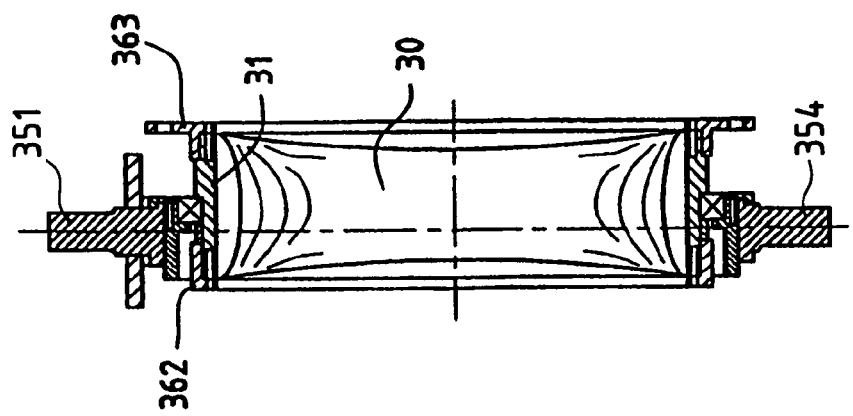
FIG.5H2 Section B/B
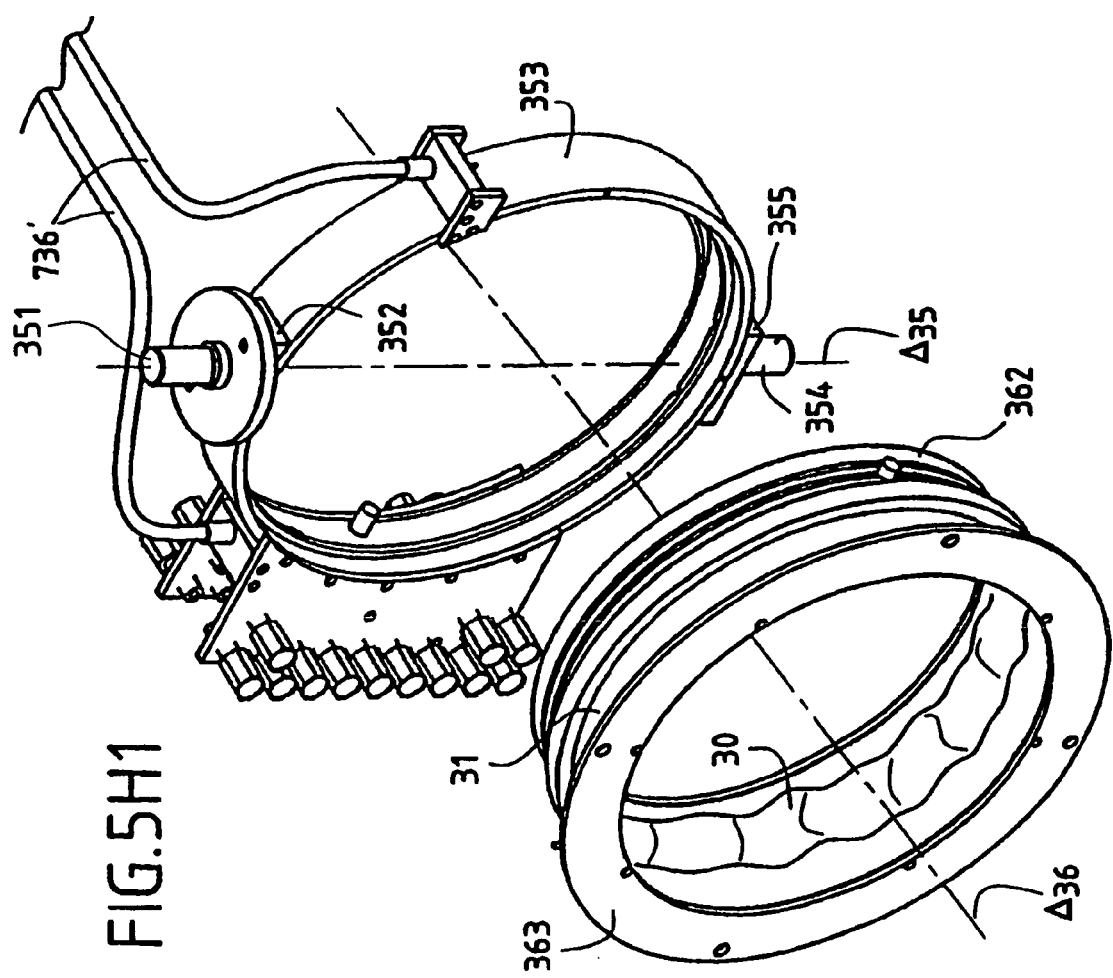
FIG.5H1

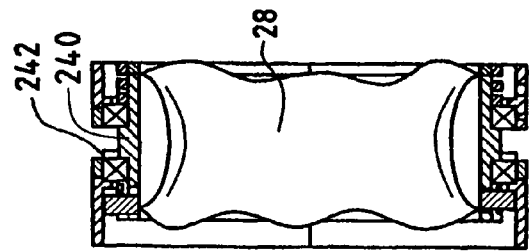
FIG.7B
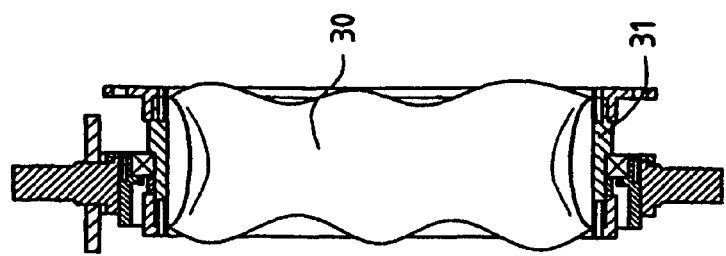
FIG.7A
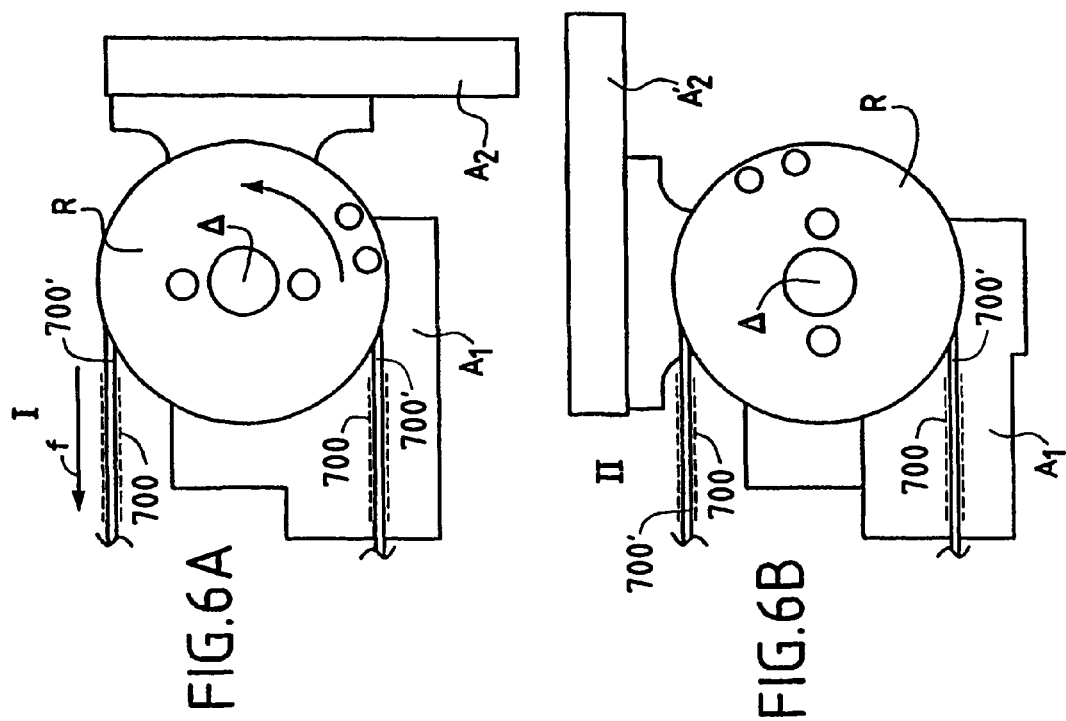
FIG.6A
FIG.6B

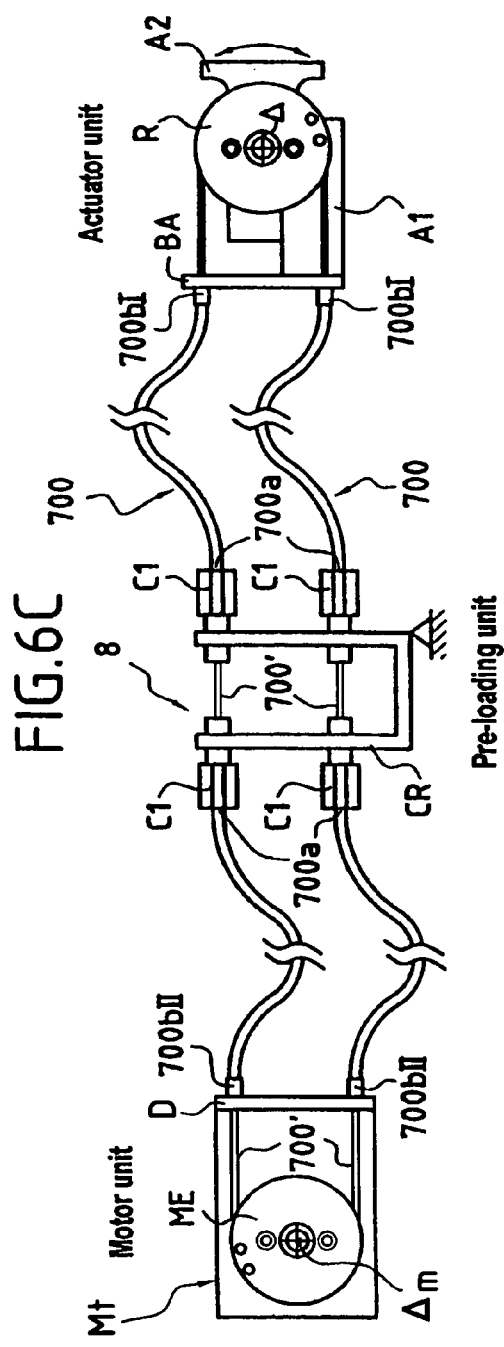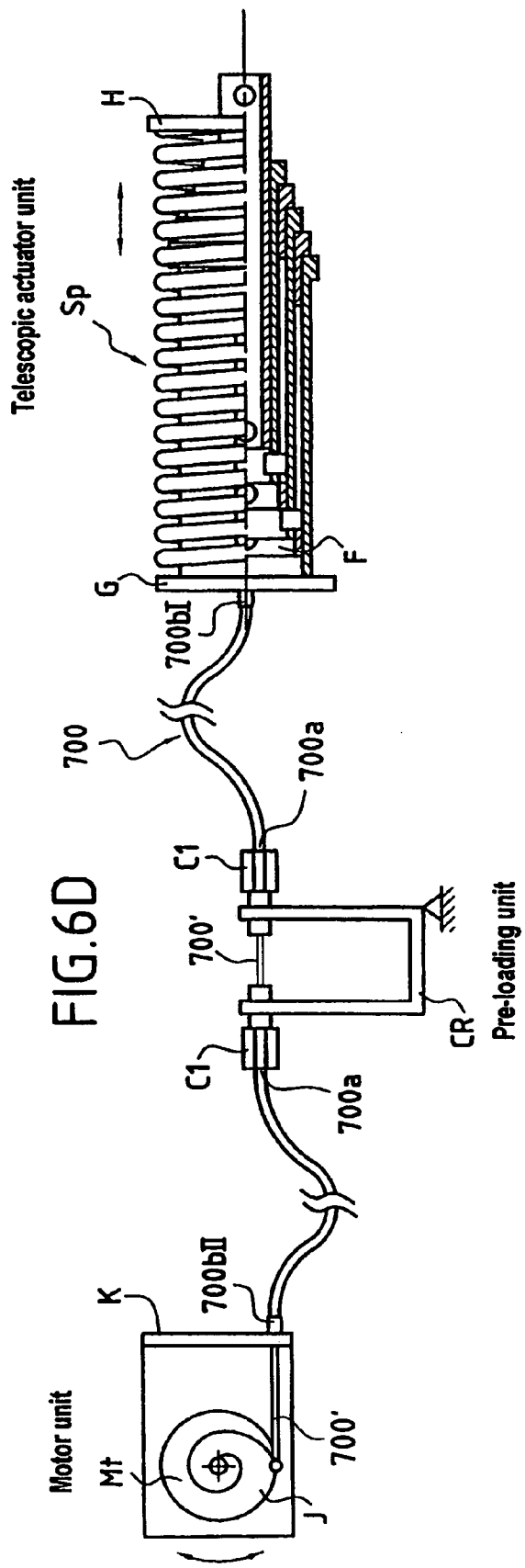

EXOSKELETON FOR THE HUMAN ARM, IN PARTICULAR FOR SPACE APPLICATIONS

FIELD OF THE INVENTION

The invention relates to an exoskeleton for the human arm.

A particular, but non-exclusive, application for the invention lies in space technologies.

BACKGROUND OF THE INVENTION

As a preliminary point, it is appropriate to recall the meaning of the term "exoskeleton", particularly as used in the context of the invention.

The term "exoskeleton" was originally used in biology for designating the outer supporting shell of an animal. For example, arthropods have an outer shell of chitin instead of an internal skeleton. More recently, the term has also been associated with structural devices designed to be attached around the limbs of people.

Still more recently, a new category of devices has been added to the family of exoskeletons: these are mechanisms used, for example, for the purpose of increasing the performance that can be delivered by a human, a robot, or indeed while interaction with virtual reality. Other possible applications for such mechanisms are described below.

By way of concrete example, the text below relates to the preferred application of the invention, specifically to its application to space technologies. Still more precisely, consideration is given to remotely controlling a humanoid type robot working outside a space station, for example the international space station. In the context of this application, the robot could be the robot known as "Eurobot" which is intended to provide highly accurate and dextrous means for performing inspection, maintenance, and repair actions on equipment in the highly hostile environment of space. The robot is fitted with three moving arms similar to human arms (i.e. in particular having seven degrees of freedom). Most of the time, the robot is programmed to perform pre-established tasks, but in some circumstances the robot needs to be remotely controlled:

either by astronauts inside the space station; or else directly by operators who have remained on the earth.

In both cases, the need to perform very precise manipulations makes it necessary to use so-called "immersion" techniques. For this purpose, the operator wears video goggles, force feedback gloves, and one or more arm exoskeletons so as to be able to feel the same sensations as the robot, i.e. the sensations which the operator would feel when performing the tasks that are being executed by the robot.

The need to create an exoskeleton compatible with operators on earth or with astronauts leads to various constraints. It is necessary for the system to be light in weight (typically less than 5 kilograms (kg)), compact, and easy to wear.

Exoskeletons in the state of the art generally suffer from various drawbacks and/or insufficiencies, such as the following:

it is not possible to feel all of the movements of the human arm and to obtain feedback forces and torques, without limiting the normal range of movements available to the human arm; it is in particular necessary to obtain information concerning the position of the shoulder, of the elbow, and of the wrist;

it is difficult to produce a system that is genuinely "portable", which means that the movements of the operator should not be limited while the device is in use (turning around an article, leaning over, walking, etc.); and limited ability to be fitted, which means, for example, that a given exoskeleton is not suitable for use with a high percentage of the male population, typically the $5^{th}$ to $95^{th}$ percentile range, without itself being significantly modified.

More precisely, human arm exoskeletons need to overcome a major problem, namely that of imitating the movements of the complex human joints that are constituted by the shoulder, the elbow, and the wrist. Imitation is difficult because these joints are closely covered, with their axes of rotation moving with changing posture of the arm. In the state of the art, exoskeletons have attempted to deal with the problem of the shoulder by implementing a mechanism that rests on the human shoulder from above and behind. The imperfections of that approach can be found in the bulk and the weight of the mechanism. It also weighs down the arm. Similarly massive solutions have also been used for the wrist.

In general, it is also found that in known exoskeleton mechanisms, the complex movements of the joints of the human arm are simplified and reduced to joints having respective single degrees of freedom, or "DOF" in order to simplify description. The drawback of that solution is that normal movements of the "master" arm (i.e. the arm that imposes actions) is disturbed and it is not possible to achieve a sensation of comfort while the "slave" arm is in operation (force feedback).

Without being exhaustive, there follows a brief description of various known solutions, pointing out their limitations.

U.S. Pat. No. 4,575,297 A (Hans Richter) describes a robot having a chest plate, an upper arm member, and a lower arm member having finger and thumb units into which the human limbs are inserted. A human operator to whom the robot members are attached sits on a support structure such as a moving chair. The robot members, their lengths, the joints between them, and the joint axes correspond to those of the human operator. Each joint is associated with a hydraulic motor sensor device. The shoulder portion of the robot is restricted to movements about two axes. Another axis allows the elbow to flexed or to be extended. An axis parallel to the axis of the forearm allows the forearm to turn. On the wrist, a knuckle joint parallel to the swivel joint of the elbow provides means to enable the wrist to move in human manner.

The exoskeleton mechanism taught by the above-specified patent copies the normal movements of a human arm. Each actuated joint is controlled by hydraulic actuators, which are directly mounted beside the joints. The range of possible movements is relatively limited. In particular movement without backlash is not possible.

U.S. Pat. No. 5,967,580 A (Mark E. Rosheim) relates to a pair of connected-together joints and to force-generator means for using them in slave robot systems. The patent relates to an anthropomorphic mechanical manipulator providing some of the capabilities of a human torso and it can move in ways similar to the chest, the shoulder, the arm, the wrist, and the hands of a human. Again, the moving structure of the robot described in the above-specified patent resembles the moving structure of a human arm. It follows that it is desired to provide a mechanical manipulator resembling the upper human torso and the arm, and capable of being provided with movement options substantially equivalent to those available to the upper arm and torso of a human. A mechanical structure provides means for engaging the hands of an operator.

A counterpart mechanism can be used as an exoskeleton for controlling the slave robot, but it is not optimized for that use per se. It is possible to provide force feedback only in the portion of the exoskeleton that is equivalent to the hand. The two mechanisms are equivalent to the upper structure of a human limb in terms of movement (parameters of the limbs and the joints). Each axis of rotation is directly controlled by direct current (DC) linear motors. Only a very limited range of normal human movements of the arm can be covered with the exoskeleton mechanism as described. As mentioned above, force feedback is possible only for the human hand, with this characteristic being the main object of the patent.

U.S. Pat. No. 6,301,526 A (mun Sang Kim et al.) relates mainly to a device having a force feedback function and which is mounted on a human arm. This can return feedback information concerning operating limits by using motor brakes. The main device is a series type chain configuration fixed on the back of an operator. Second and third combining means are fixed above and below the elbow, and fourth combining means are fixed to a back portion of the hand. Seven axes of the exoskeleton include electric brake units for generating torque. Position-determining units and gear units for amplifying torque are associated with the actuator units.

The base of the moving system is fixed to the operator's back and not to the chest. The movement of the exoskeleton can be influenced only by passive electric brakes, which can be used only to damp the natural movements of the human arm.

International patent application WO 95/32842 A2 (AN, Bin) relates to a system having the same degrees of freedom as the human arm, and which therefore needs to be attached closely to the human arm. The system also moves in a manner equivalent to the arm of an operator. The exoskeleton is fixed on the operator's back and all the components that form an interface with the human body are adjustable. As a result, any misalignment between the operator and the system imparts movement constraints on the human joints and is very uncomfortable, impeding natural anatomic movements. That invention relates mainly to the problem of attaching the exoskeleton to the operator, which problem is solved by means of special design features.

Movements are restricted to only five degrees of freedom. Movements of the shoulder girdle, and movements of the wrist are neither detectable nor controllable. Each axis is actuated directly by a DC motor device, which is mounted close to an appropriate joint axis. Because of its highly simplified moving structure, many of the components need to be designed to be adjustable. The base of the exoskeleton is fixed on the upper portion of the operator's back.

It can be seen that prior art exoskeletons, some of which are described above, present major limitations and do not make it possible to satisfy fully the needs that are felt, in particular in space applications. Prior art exoskeletons are for the most part based on a mechanism which seeks to imitate or to approximate as closely as possible the movements of human limbs. Finally, as can be seen from the description below of the invention, prior art exoskeleton mechanisms present major structural differences compared with the mechanism implemented in the invention.

OBJECTS AND SUMMARY OF THE INVENTION

The invention seeks simultaneously to mitigate the drawbacks of prior art devices, some of which are outlined above, and to satisfy the needs that have been felt, and which are also summarized above.

An object of the invention is to provide an exoskeleton for the human arm presenting, in particular, all of its degrees of freedom, which is lightweight, portable since it does not limit the movements of the operator, fittable to a large percentage of the population without significant modification, capable of sensing all of the movements of the human arm, not limiting on the range of natural movements, and comfortable.

To do this, and in practical manner, the structure of an exoskeleton in accordance with the invention presents the following essential characteristics:

The support base of the arm exoskeleton of the invention resembles half of the top of a suit of armor. It has two rigid chest plates (front and back) and a hinged sleeve. The chest plates are fixed to the operator's torso by straps or any suitable equivalent means. The front plate serves as a structural base for a system of joints to which the sleeve is joined. It provides a fixed reference for all movements of the exoskeleton. The back plate carries motors that move the joints of the sleeve. The motors are connected to the joints by a series of flexible tendons which actuate them.

The exoskeleton of the invention presents several advantageous technical characteristics.

According to a first important characteristic, the movements specific to an exoskeleton of the invention are designed in a special manner. There is no attempt to imitate the movements of the shoulder, of the elbow, and/or of the wrist of a human. On the contrary, an alternative moving system providing the same freedom of movement is placed in parallel with the human joints. This system and the human joints form a closed dynamic loop which:

for the shoulder begins at the attachment of the arm to the sternum, extends over the scapulo-clavicular and glenohumeral joints at the ends of those bones, and terminates in the middle of the humerus;

for the elbow begins in the middle of the humerus and terminates in the middle of the forearm: and for the wrist begins in the middle of the forearm and terminates in the middle of the palm of the hand.

Although the parallel moving system of the exoskeleton is different from that of the arm, each posture of the human joints can be determined unambiguously by the corresponding posture of the moving system of the exoskeleton.

The advantages provided by this approach are numerous and can be summarized as follows:

the weight of the system is not supported by the arm but by the torso;

the full range of shoulder, elbow, and wrist movements is available;

the joints themselves are simpler and smaller; and there is no need to align the axes of the human joints with those of the exoskeleton: it follows that no lengthy and complex adjustment procedure is needed before the exoskeleton is operational.

The base of the exoskeleton is a portion of the human body. Consequently, the exoskeleton can be designed as a portable system which provides more flexibility for the general movements of the operator. By using a portable exoskeleton controller, remote control in weightlessness, or at least in microgravity, is greatly simplified since no resultant force on the body of the operator can cause a movement that moves the operator away from the control station. By way of example, if force feedback joysticks were used, they would create forces against the body of the astronaut, pushing the astronaut away from the joystick. Consequently, the astronaut needs to be attached in a suitable location, thereby restricting the operations the astronaut can perform.

A second important characteristics relates to the fact that all of the actuated joints in the exoskeleton (i.e. its non-passive joints) are controlled by cable tendon transmissions. In the prior art, it is common practice to use electrical control members directly mounted on the exoskeleton. Those dispositions make the exoskeleton bulky, heavy, and require a large number of control units in order to remain compatible with high weight. The use of cable tendons in the invention makes it possible to place the control unit on the back plate of the exoskeleton. The weight of the control members is thus carried by the torso. The result obtained is an arm that is extremely lightweight and can be controlled by smaller control members.

A third important characteristic relates to the ability of the exoskeleton of the invention to be fitted to different humans. Because of its specific structural characteristics, as described below, the master arm can be fitted to practically any human subject (the above-mentioned percentile range). The adjustments required for adapting the exoskeleton can be performed while it is being worn and are typically restricted to tightening two screws or equivalent members, as also described below.

The invention thus mainly provides an arm exoskeleton for acquiring data representative of the movements of the arm joints of a human operator by means of measurement sensors and for feeding back forces and/or torques to joints of the arm exoskeleton by means of actuation units associated with at least some of said operator arm joints, the exoskeleton comprising a first device in the form of a sleeve for wearing on at least one arm of an operator so as to form a moving system of exoskeleton joints disposed parallel to said arm joints, said device comprising a first subassembly or "shoulder exoskeleton" comprising a first determined number of joints associated with the shoulder joints of said operator, a second subassembly or "elbow exoskeleton" comprising a second determined number of joints associated with the elbow joints of said operator, and a third subassembly or "wrist exoskeleton" comprising a third determined number of joints associated with the wrist joints of said operator, wherein said actuation units are controlled by flexible tendons bridging said subassemblies, said first to third subassemblies being mechanically dissociated so as to be capable of being controlled individually by said flexible tendons; and the exoskeleton further comprising a second device forming a support and worn on the torso of said operator, the second device comprising a front or "chest" rigid plate and a rear or "back" rigid plate, said shoulder exoskeleton being fixed at its proximal end to said front plate, thereby providing a fixed reference for all movements of said exoskeleton.

The invention also provides the use of an arm exoskeleton for remotely controlling a robot of humanoid type working outside a space station, the robot being provided with artificial arms and performing tasks under the control of a human operator, said arm exoskeleton being worn on at least one of the operator's arms, said robot receiving data causing it to execute movements unambiguously related to the movements of the arm and transmitting feedback data forcing all or some of said joints of said arm exoskeleton to execute movements, thereby giving rise to corresponding movements of the arm.

BRIEF DESCRIPTION OF THE DRAWINGS

The invention is described below in greater detail with reference to the accompanying drawings, in which:

FIGS. 1A and 1B are diagrams showing an embodiment of an arm exoskeleton of the invention worn by an operator, seen respectively from in front and from behind;

FIG. 2 is an exploded view showing the three main subassemblies of an exoskeleton of a preferred embodiment of the invention, namely the wrist subassembly, the elbow subassembly, and the shoulder subassembly, respectively;

FIGS. 3C1 to 3C3 show a first member of the wrist subassembly of the FIG. 3A exoskeleton, respectively in three dimensions, in side view, and in section on C/C of FIG. 3C2;

FIGS. 3D1 to 3D3 show a first member of the wrist subassembly of the FIG. 3A exoskeleton respectively in three dimensions, in plan view, and in section on H/H of FIG. 3D2;

FIGS. 3E1 to 3E3 show a third member of the wrist subassembly of the FIG. 3A exoskeleton, respectively in three dimensions, in side view, and in section on L/L of FIG. 3E2;

FIGS. 3F1 to 3F3 show a fourth member of the wrist subassembly of the FIG. 3A exoskeleton, respectively in three dimensions, in plan view, and in section on R/R of FIG. 3F2;

FIGS. 3G1 to 3G3 show a fifth member of the wrist subassembly of the FIG. 3A exoskeleton, respectively in three dimensions, in side view, and in section on U/U of FIG. 3G2;

FIGS. 3H1 to 3H3 show a sixth member of the wrist subassembly of the FIG. 3A exoskeleton, respectively in three dimensions, in front view, and in section on Q/Q of FIG. 3H2;

FIG. 4A shows in greater detail the elbow subassembly of the FIG. 2 exoskeleton, in three dimensions seen from the outside and in front, worn on the arm of an operator and attached to the elbow, the forearm extending vertically upwards;

FIG. 4B is a diagrammatic three-dimensional view showing the various joints associated with the elbow subassembly of the FIG. 4A exoskeleton, together with their axes of rotation:

FIGS. 4C1 and 4C2 are more detailed views, respectively a side view and a plan view, showing the bundle of tendons and the pre-tensioning or "pre-loading" unit of the elbow subassembly of FIGS. 4A and 4B;

FIGS. 4D1 to 4D3 are more detailed views showing the members of one of the joints of the elbow subassembly of the exoskeleton of FIGS. 4A and 4B, respectively in a three-dimensional three-quarter view, in plan view, and in section on M/M of FIG. 4D2;

FIGS. 5E1 to 5E3 are more detailed views showing a first member of the shoulder subassembly of the exoskeleton of FIGS. 5A to 5D, respectively in three dimensions, in plan view, and in section on D/D of FIG. 5E2;

FIGS. 5F1 to 5F4 are more detailed views showing a second member of the shoulder subassembly of the exoskeleton of FIGS. 5A to 5D, constituted by a telescopic joint shown respectively in the long state as an end view and as a side view partially in section, and in the short state, as an end view and as a side view partially in section;

FIG. 5F5 shows a detail of the telescopic joint of FIGS. 5F1 to 5F4;

FIGS. 5G1 to 5G3 are more detailed views showing a third member of the shoulder subassembly of the exoskeleton of FIGS. 5A to 5D, respectively in three dimensions, in plan view, and in section on A/A of FIG. 5G2;

FIGS. 5H1 and 5H2 are more detailed views showing a third member of the shoulder subassembly of the exoskeleton of FIGS. 5A to 5D, which subassembly includes an inflatable cushion, the views being respectively a three-dimensional view and a section view on B/B;

FIGS. 6A to 6C are diagrams showing the mechanism for actuating the joints of the exoskeleton of the invention by means of cable tendons;

FIG. 6D is a diagram showing the mechanism for actuating the telescopic joint of FIGS. 5F1 to 5F5; and FIGS. 7A and 7B are sagittal section views of the inflatable cushion members for fixing to the upper arm and to the forearm, respectively.

MORE DETAILED DESCRIPTION

Figure 3A:
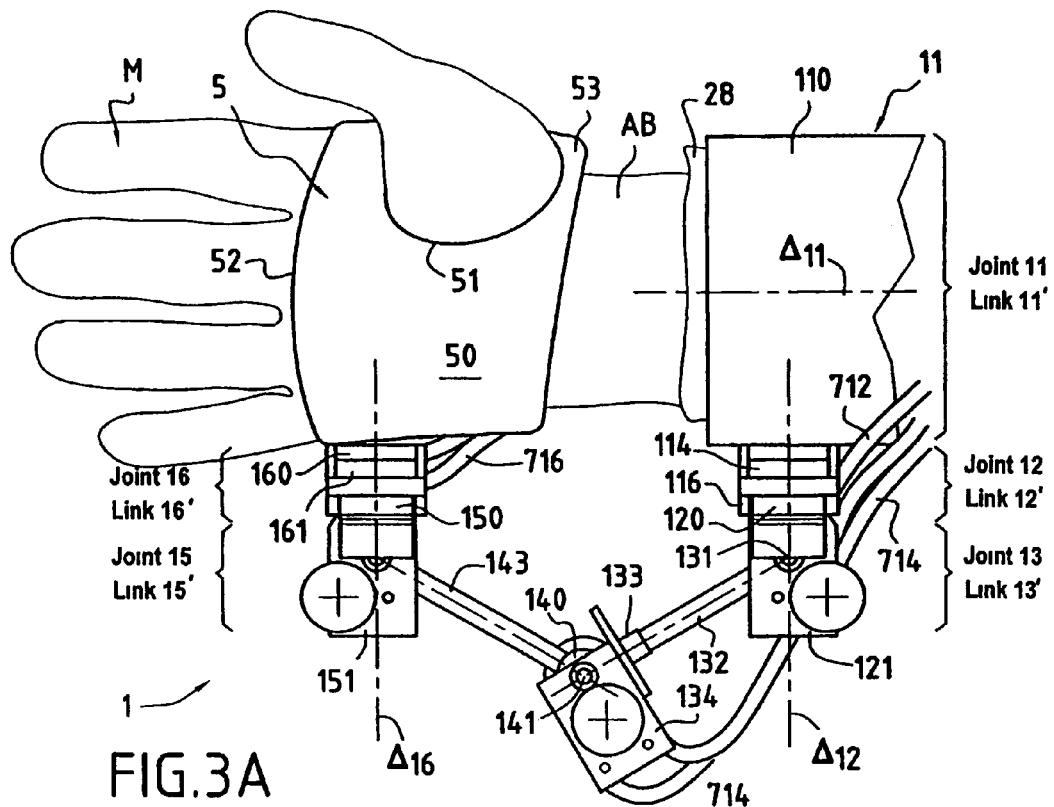
FIG. 3A is a more detailed diagram showing the palm of the wrist subassembly of the FIG. 2 exoskeleton, while being worn on the hand of an operator.

In the description below, as mentioned above and without any limitation as to scope, reference is made to the context of the preferred application of the invention, namely that of an operator remotely controlling the operations of a humanoid type robot in space working outside a space station, the operator (e.g. an astronaut) wearing an arm exoskeleton of the invention.

The robot does not directly contribute as such as to the invention and it is not shown in the figures. A priori, any robot of the prior art can be implemented in the context of the invention without needing modification.

In a manner that is well known for applications of this type, it is common practice to provide data communications between the robot and a fixed station (located in the space station and/or on earth), or to provide communications directly between the robot and a data processor system associated with the exoskeleton. It is possible to use any both-way data transmission means, and advantageously to use radio transceiver means.

The "go" data is constituted by orders transmitted to the robot in order to actuate it as a function of the particular movements that the operator imparts to the exoskeleton. The robot reproduces the movements of the exoskeleton. In the opposite direction, the robot sends "feedback" data enabling the operator physically to "feel" the forces and torques to which the robot is subjected, instead of being restricted to perceiving them only "visually", e.g. by following the tasks performed by the robot on a display screen.

This feedback on the operator is most important since it makes it possible, for example, to enable the remotely-controlled robot to exert only the precisely-required amounts of force or torque.

A practical example of an arm exoskeleton in a preferred embodiment of the invention is described below with reference to FIGS. 1A to 7B. In these figures, elements that are identical are given the same references and are described again only where necessary.

FIGS. 1A and 1B are diagrams showing an example of an arm exoskeleton EXB constituting a preferred embodiment of the invention and showing its main components. The arm exoskeleton EXB is shown being worn by an operator U, seen in front view (FIG. 1A) and in fragmentary back view (FIG. 1B).

As mentioned above, the arm exoskeleton proper EXB comprises three main subassemblies: a wrist subassembly 1; an elbow subassembly 2; and a shoulder subassembly 3, respectively. These three subassemblies 1 to 3 are dedicated to detecting relative movements of a wrist P, an elbow C, and a shoulder E of operator U, and to actuating the associated joints. They form a sleeve which is worn on one of the operator's arms, for example a right arm Bd.

In FIGS. 1A and 1B, the subassemblies 1 to 3 of the arm exoskeleton EXB are shown as being worn on the right arm Bd of the operator U since it is assumed that the operator is right-handed. Naturally, the device of the invention is not limited in any way to this characteristic. It can equally well be worn on a left arm Bg of operator U, or on both arms, without thereby going beyond the ambit of the invention.

The three subassemblies 1 to 3 form a moving system having specific characteristics that are described below. This system is shown in greater detail in an exploded view in FIG. 2.

According to another important characteristic of the invention, the above-mentioned moving system, and more precisely its wrist subassembly 1, is fixed to a glove 5 worn on one of the hands M of the operator, in this case the right hand. The operator could wear such gloves on both hands.

According to another important characteristic of the invention, the above-mentioned dynamic moving system is fixed more precisely by means of its shoulder subassembly 3 to a torso TH of the operator U by means of a support base 4.

In a preferred embodiment, the support base 4 resembles half of a piece of a suit of armor. It comprises two rigid plates: a front or "chest" plate 40 (FIG. 1A) and a rear or "back" plate 41 (FIG. 1B). The rigid plates 40 and 41 are fixed to the torso TH of the operator U by straps 42, or by any appropriate equivalent means. The front plate 40 serves as the structural base for the system of joints constituting the subassemblies 1 to 3. It provides a fixed reference for all movements of the arm exoskeleton EXB.

According to another important characteristic of the invention, the various subassemblies 1 to 3 of the above-specified moving system are connected together by bundles of flexible tendons 7 of the cable type for actuating particular joints associated with the subassemblies 1 to 3, which joints are said to be "active" and are actuated in turn by motors Mt (FIG. 1B).

In reality, the flexible tendons are constituted by two distinct types of element; cables proper and spiral-type sheaths guiding the cables over the major part of their lengths. In the figures, the visible portions of the bundles 7 are constituted essentially by the sheaths.

It is by using the above-mentioned active joints that feedback forces and/or torques can be imparted to the arm exoskeleton EXB so as to be felt by the operator U.

There are two different bundles of cables, referred to arbitrarily as "bundle No. 1" and as "bundle No. 2". A first bundle goes from the back of the operator U to a pre-loading unit in the shoulder subassembly 3, and then from there along the structure of an initial loading unit of the elbow subassembly, and then from there to the wrist P. The second bundle goes directly from the back to the joints prior to penetrating in a pre-loading unit at the base of the exoskeleton EXB.

In contrast, other joints, referred to as "passive" joints, cannot exert any force or torque on the human arm Bd, but can nevertheless be associated with movement sensors, thus making it possible for the movements of the human arm Bd of the operator U, optionally to be detected and transmitted in the form of corresponding movement data. By way of example, sensors referenced $Ca_{12}$ to $Ca_{16}$, $Ca_{21}$ to $Ca_{32}$, $Ca_{31}$ to $Ca_{36}$, 218 and 226 are shown in various figures accompanying the present description.

The back plate 41 carries the above-mentioned motors Mt. As shown in FIG. 1B, it is assumed that the motors Mt (not shown explicitly) are housed inside a pack 6 fixed to the plate 41. Advantageously, DC motors are used.

The pack 6 is connected in particular to the moving system, and more particularly to the shoulder subassembly 3, by means of the bundle of tendons 7.

The motors also include transceiver circuits for data and instructions communicating with the robot that is to be remotely controlled, either directly or else via an intermediate station (not shown).

The motors Mt actuate one or more joints of the subassemblies 1 to 3 by acting on the corresponding flexible tendons of the bundle 7 in the manner described below.

The moving system is described in greater detail below.

Overall, the master arm of the exoskeleton EXB comprises sixteen joints, and therefore has sixteen degrees of freedom or "DOF". Each axis is fitted with an angle sensor in order to pick up information concerning joint angles (i.e. turning movements about particular axes).

As mentioned above, the joints are grouped together in three subassemblies:

the wrist subassembly 1 (having six DOF);
the elbow subassembly 2 (having four DOF); and
the shoulder subassembly 3 (having six DOF).

FIG. 2 is an exploded view of these three mechanisms 1 to 3 interconnected by a bundle of flexible tendons 7.

According to an essential characteristics of the invention, the master arm is not designed to imitate the arrangement of human joints, but instead to connect with them by means of an alternative moving system of joints disposed over the human limb: i.e. the arm Bd in the example described. Each of these three subassemblies 1 to 3 thus represent an alternative structure for the wrist P, the elbow C, and the shoulder E (see FIG. 1A).

The three subassemblies 1 to 3 of the moving system of the arm exoskeleton EXB are described below in greater detail. For ease of understanding, the description begins with the shoulder subassembly 3.

Figure 5A:
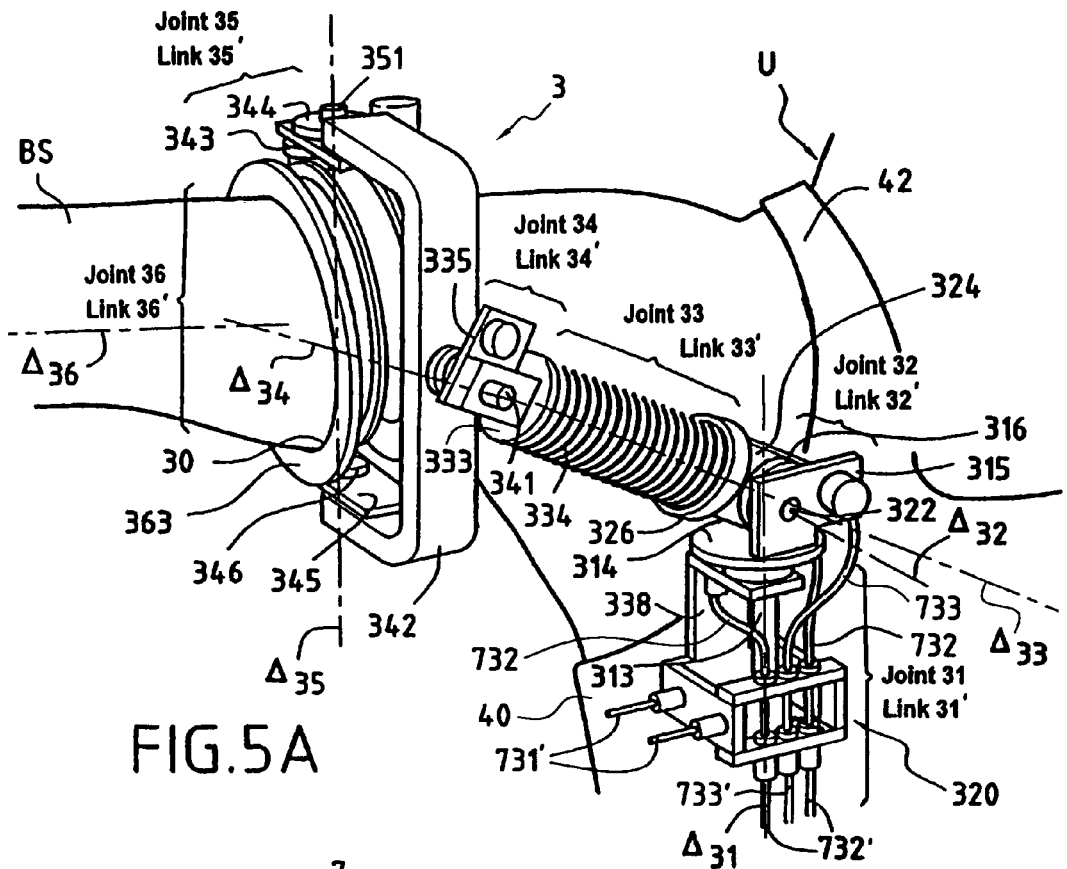
FIGS. 5A and 5B are more detailed views showing the shoulder subassembly of the FIG. 2 exoskeleton worn on the arm of an operator and attached to the shoulder, in three-quarter views respectively from in front and from above.
Figure 5B:
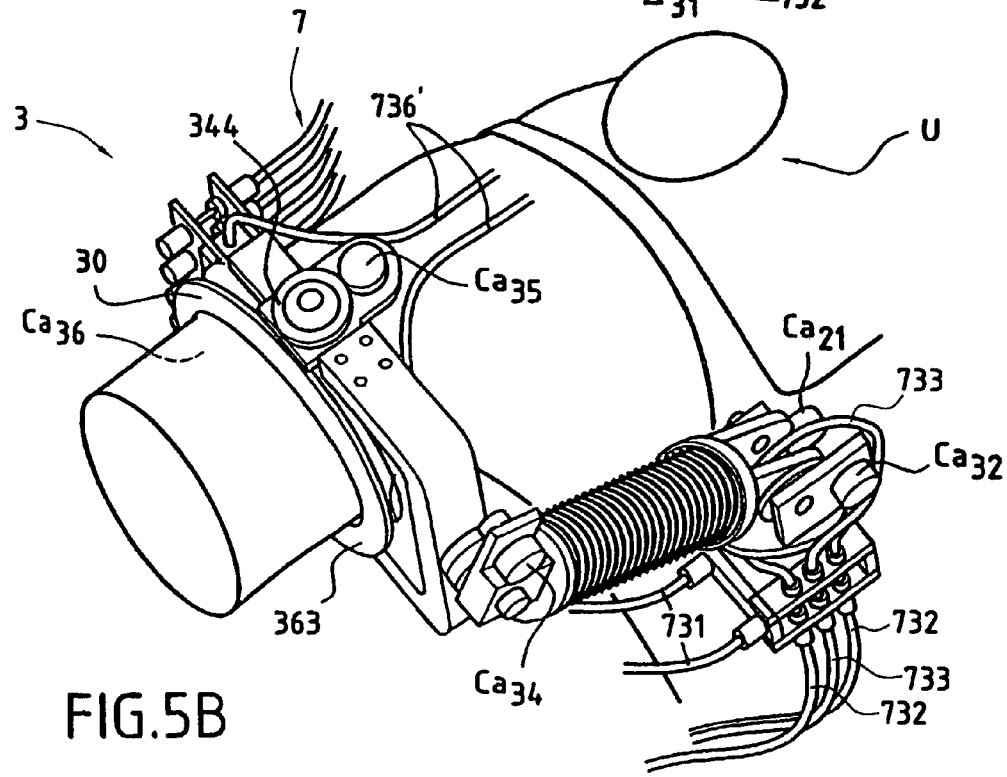

FIGS. 5A and 5B show the shoulder subassembly 3 respectively as a front view and in top three-quarter view. In these figures, the head of the operator U is not shown and the bundle of flexible tendons 7 is shown as being cut. Reference is also made to detail FIGS. 5E1 to 5H2.

Figure 5C:
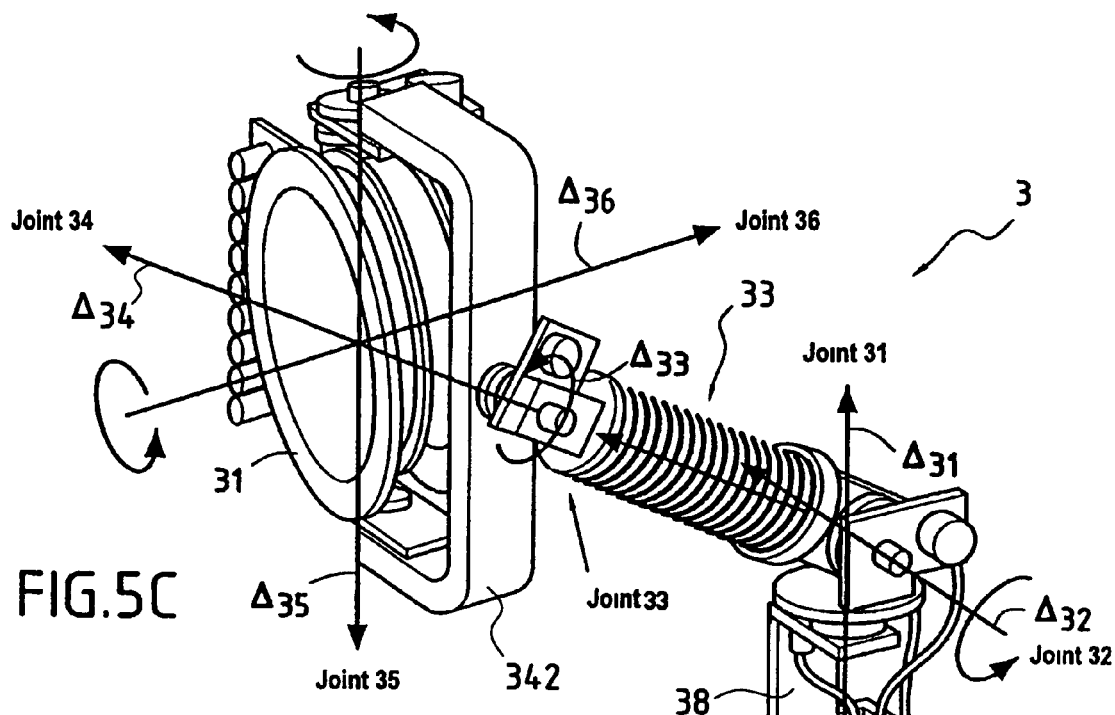
FIG. 5C is a diagrammatic three-dimensional view showing the various joints associated with the shoulder subassembly of the exoskeleton of FIGS. 5A and 5B, together with their axes of rotation.

The subassembly 3 includes six joint axes, five of a rotory or "rotoid" type, and one of a sliding or "prismatic" type. FIG. 5C is an isometric view showing, in three dimensions, the relative positions of these six axes which are referenced $\Delta_{31}$ to $\Delta_{36}$, for a particular posture of the shoulder E of the operator U at a given instant. The corresponding joints are referred to as "joint 31" to "joint 36".

The subassembly 3 is designed to perform the same movements as a human shoulder E, even though the five DOF of the human shoulder E are simulated by a mechanism having six DOF.

By means of these dispositions, the movement of the exoskeleton shoulder 3 is not limited, either in amplitude or in dexterity.

The base of the shoulder exoskeleton 3 constitutes the complete base of the serial linkage of the arm exoskeleton EXB, and it is secured to the rigid chest plate 40 which is secured to the torso TH of the operator U by means of straps 42. The connection is provided via a fixing piece which serves as a parent link for the first joint of the exoskeleton EXB.

The distal end of the subassembly 3 is situated at the base of the top portion of an arm BS of the operator U where it is fixed by means of an inflatable cushion 30, itself surrounded by a rigid annular piece 31.

With the exception of the third joint 33 of axis $\Delta_{33}$ which is of the sliding type, all of the other joints are of the rotary type. The first and second joints having respective axes $\Delta_{31}$ and $\Delta_{32}$ are active joints and they are actuated by respective flexible tendons 731' and 732' forming part of the bundle of tendons 7.

They are turned by applying traction to the tendons which are fixed via pulleys to turn shafts on the corresponding joint axes, as described below. More precisely, each of these joints is actuated by a pair of tendons, thus enabling it to move either clockwise or counterclockwise.

In order to describe the system in greater detail, reference is made to the figures, namly FIG. 5A. The first joint about the axis $\Delta_{31}$ is a rotary joint and is actuated by two tendons 731' forming part of above-mentioned "bundle No. 2". This joint combines the fixing piece 38 with the first member of a link 31'. The link 31', which is the child link of the first joint, comprises a pulley 312 (best seen in FIG. 5E3) which is fixed to a rotary shaft 313 which is connected via ball bearings to the fixing piece 38. The shaft 313 is also rigidly connected to a circular plate 314 which is screwed under two side walls 315 and 316 (best seen in FIG. 5E3). Given the function of the first joint, all of the members of the first link 31' are capable of turning relative to the fixing piece 38 about the axis $\Delta_{31}$. The second joint, which is another rotary joint turning about the axis $\Delta_{32}$, connects the link 31' to the child link of the second joint, referred to as link 31'. This link has another shaft 322 which is constrained to rotate with the side walls 315 and 316. The pair of tendons 732' (guided by spiral-type sheaths 732) passes through a pre-loading unit 320 and is fixed to the pulley 323. Two side walls 324 and 325 are screwed together to a telescopic connection 326. The shaft 322 is centered in a middle zone of the side walls by means of ball bearings enabling the link 31' to rotate completely about the shaft 322 and thus about the common axis $\Delta_{32}$. The pulley 323 is rigidly fixed to the side walls and thus moves the link 32' relative to the link when the tendons 732' pull or push.

The joint 33 of sliding type along axis $\Delta_{33}$ is provided with a telescopic tube F (FIG. 6D) extended by a pre-tensioning spring SP.

The spring SP is of the coil spring type. A tendon 733' running through sheath 733 and attached to the end of the tube and running along the tube enables the telescopic tube to retract by contracting the spring. Prior to passing through the telescope, the tendon 733' passes through the pre-loading unit 320.

A fixed link of the telescopic joint 33 is constituted by a first telescopic tube 332 (FIG. 5F2) and is combined with telescopic connection 326 (FIG. 5E1 . A moving link 33' comprises a telescopic tube system F and distal ends of a telescopic connection 333 which are secured to an intermediate piece 335. By means of a compression spring 334, the distal telescopic connection 333 is pre-loaded against the telescopic connection 326. If the tendon 733' opposes the force of the spring SP, it causes the telescopic tubes to contract along the common axis $\Delta_{33}$. The joint 34, which is a passive joint of rotary type, joins the link 33' with the link 34'. The joint 34 enables the link 34' to turn about the axis $\Delta_{34}$.

The link 34' comprises a shaft 341 which is connected by radial ball bearings to intermediate piece 335 enabling rotation about the axis $\Delta_{34}$. The axis $\Delta_{34}$ is secured to a U-shaped piece 342 which carries two additional plates 343 and 345 at its two distal ends. These plates contain ball bearings for turning about the axis $\Delta_{35}$, and they are associated with respective top plates 344 and 346.

The fifth joint 35, which is also a passive rotary joint, connects link 34' with link 35' while allowing turning about the axis $\Delta_{35}$. The link has two pieces colinear with the axes of the shafts 351 and 354 which are fixed on an outer ring 353 by means of fixing plates.

Thus, the fixing plate 352 fixes the shaft 351 to the outer ring 353, and the fixing plate 355 fixes the shaft 354 to the bottom of the ring 353. The two shafts pass through ball bearings which are held respectively between the additional plate 343 and the top plate 344, and between the additional plate 345 and the top plate 346.

The joint 36 of axis $\Delta_{36}$ is an active joint, and it is used for imparting torque to the top portion of the arm BS.

A pair of tendons 736' coming from the back of the operator U pass through the outer ring 353 without touching it and are attached to an inner ring 362 which acts as a hollow pulley. The inner ring 362, which is a member of link 36', is attached to another circular ring 31 which carries inflatable cushions 30. The circular ring 31 is connected to the outer ring 353 by means of small section ball bearings, enabling rotation to take place about the axis $\Delta_{36}$. The connection ring 363 is screwed to the ring 31 and another member of the link 36'. Thus, joint 36, which can be operated by the tendons 736', enables the link 36' to perform turning movements inside the outer ring 353, and thus inside the link 35' about the sixth joint axis $\Delta'_{36}$ The three joints 34 to 36 have their axes $\Delta_{34}$ to $\Delta_{36}$ intersecting at a single point, thus enabling them together to act as a simple spherical joint at the distal end of the subassembly 3.

Figure 5D:
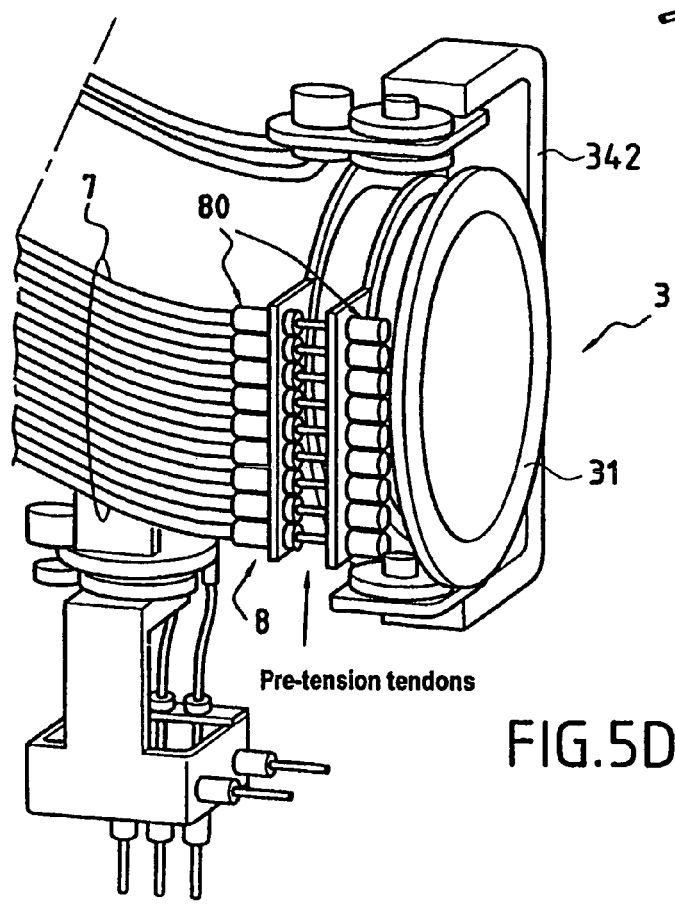
FIG. 5D is a back view of the tendon pre-tensioning mechanism associated with the shoulder subassembly of the exoskeleton of FIGS. 5A and 5B.

FIG. 5D is an isometric back view showing the system 8 (device 80) for pre-tensioning the tendons of the bundle 7 in three dimensions.

By means of this system, the tendons, which are guided inside sheaths, can be pre-tensioned so as to put the outer sheath under compression.

FIG. 6C shows in greater detail the general configuration of such a pre-loading unit 8.

Each pre-loading unit in the design of the exoskeleton EXB comprises similar devices.

A general description of the components involved and how they operate is given below. A rigid structure establishes a rigid reference and is referred to herein as CR, said structure being used for receiving screws $C_1$ for pre-loading the tendons. These screws $C_1$ are hollow and the tendons pass through them, which tendons are arbitrarily referenced 700'. A sheath 700, which guides each tendon 700', is intersected at the point where the pre-loading unit is located, and the intersecting ends 700a of the sheaths terminate at the outside surfaces of the pre-loading screws $C_1$. Since the distal ends of sheaths 700 are stopped at points close to the actuation unit at 700bI and close to the motor unit at a point 700bII, the sheath 700 is compressed as soon as the pre-loading screws $C_1$ are turned clockwise. This increased compression in the spiral sheaths 700 surrounding the tendons 700' tensions the tendons. The tendons 700 are threaded along the sheaths which means that the tendons 700 are pre-loaded.

The five DOF of the human arm and the six DOF of the shoulder exoskeleton subassembly 3 form a moving closed loop having the following properties:
  the full range of movements of the human shoulder E can be performed; and
  all of the human joints (including the scapulo-clavicular joints) can be detected and actuated.

The elbow subassembly 2 is described below in greater detail with reference to FIGS. 4A to 4D3.

FIG. 4A is more precisely a view of the elbow subassembly 2 seen from in front. It has four joint axes.

FIG. 4B is an isometric view showing the relative positions of the four axes $\Delta_{21}$ to $\Delta_{24}$ in three dimensions when the elbow C of the operator U is in a particular posture at a given instant. The corresponding joints are referenced joint 21 to joint 24.

In the left-hand portion of FIG. 4A, there can be seen two twin telescopic tubes 200 and 202 respectively which are adjustable in length, providing the means for adjusting the length of the exoskeleton to fit the human upper arm BS. Length can be adjusted by means of two screw members 201 and 203 respectively for each of the tubes 200 and 202. No other adjustment is needed.

The first ends of the telescopic tubes 200 and 202 are secured to an annular piece 204 surrounding the upper arm BS, i.e. the arm above the elbow. When the exoskeleton EXB is assembled, this annular piece is secured rigidly to the ring 363 of the shoulder subassembly 3. The second ends are secured to the piece 205 which is horseshoe-shaped, also surrounding the upper arm BS.

These two rings which are assembled together by means of telescopic tubes constitute a portion of the adjustment unit. Two additional pieces are connected to said unit: two base joint plates for joint 21. The side base plate 206 is rigidly mounted to the ring 205 and carries the shaft 207 which establishes a portion of the common joint 21. The middle base plate 208 is also connected to the proximal side of the ring 205 and carries another shaft 209 which co-operates with the shaft 207 to constitute the mechanical means enabling the joint 21 to turn about the axis $\Delta_{21}$. This configuration is best seen in FIG. 4C2. The joint adjustment unit constitutes the parent link for the joint 21. The child link of this joint, link 21', has another ring 210 of horseshoe shape. A side plate 212 is secured on its distal side to the proximal side of the ring 210. On its proximal side, the side plate 212 is mounted on the shaft 207 by means of ball bearings which permit turning movement. In addition, a pulley 213 is fixed to the side plate 212 to actuate the link 21' about the axis $\Delta_{21}$ of the joint 21. The tendons 721' which come from the cable bundle 7 pass through the side base plate 206 and are fixed to the pulley 213. Thus, by actuating the tendons, it is possible to influence or induce movements in the elbow C of the operator U. The middle plate 214 is also fixed to the proximal side of the ring 210. The proximal side of the middle plate 214 is mounted by means of ball bearings to the shaft 209 which is colinear with the shaft 207, enabling the link 21' to turn about the axis $\Delta_{21}$. Two hollow tubes 215 and 216 are attached to the distal side of the ring 210. These tubes serve as a parent link for the common sliding joint 22.

The pre-loading unit of the forearm 217 is fixed to these hollow tubes 215 and 216 by means of screws. In FIG. 4A, tendons 219 pass through the pre-loading unit 217, however, the bundle of cables 7 is not shown. FIGS. 4C1 and 4C2 show the incoming tendons of the bundle of cables 7 entering the pre-loading unit 217, while the outgoing tendons are not shown. The link 21' and the link 22' together form joint 22 which is a passive, sliding joint. The link 22' comprises two solid rods 221 and 222 which are colinear and concentric with the hollow tubes 215 and 216 so as to fit exactly in the bores of the hollow tubes, thus forming a telescopic tube system. The solid rods 221 and 222 are free to move inside the hollow tubes 215 and 216. At their distal ends, the rods 221 and 222 are attached to a piece 220 which constitutes a segment of a ring. This piece 220 has its proximal side connected to the two hollow tubes and its distal side attached to a T-shaped piece 224 which carries a small shaft 225. By means of the telescopic tubes, the link 22' can move linearly along the axis $\Delta_{22}$ relative to the link 21'.

The pre-loading unit carries a linear sensor 218 whose moving portion is fixed to a plate 223. This plate is fixed to the solid rods 221 and 222 by means of screws. Thus, when the link 22' moves along the common axis $\Delta_{22}$, the moving piece of the linear sensor moves together with the plate 223.

The link 22', which is a moving link in the joint 22, is simultaneously the parent link for the joint 23.

FIGS. 4D1 and 4D3 show the members of the joint 23 in greater detail, respectively in three dimensions, and in section M/M of FIG. 4D2. The T-shaped piece 224 carries a fixed shaft 225 having two ball bearings 226 and 227 mounted thereon; the bearings being mounted respectively on the side and middle portions respectively of the T-shaped piece 224.

The moving link on joint 23 is the link 23' which can turn passively about the axis $\Delta_{23}$ of the joint 23. This link has an outer metal ring 230 which is connected to a connection piece 231 via its bottom. This connection piece 231 is screwed between two side plates: a middle plate 232 and a side plate 233 respectively. These side plates 233 and 232 are connected to the outsides of the ball bearings 227 and 226 respectively and can thus turn about the shaft 225.

The child link 24' of the joint 24, which is a moving part, comprises a rigid ring 240 which contains an inflatable cushion 28, and a hollow pulley 241 which is attached to the proximal side of the rigid ring 240. The tendons 724' which are guided along the sheaths 724 pass through the outer ring 230 and are fixed to the hollow pulley 241 (as can be seen in FIGS. 3H1 to 3H3). The rigid ring 240 is centered inside the outer ring 230 by means of a ball bearing 242 of small section, enabling the ring 240 to turn about the axis $\Delta_{24}$ inside the outer ring 230. This turning is driven by relative movement of the tendons 724'. These tendons 724' are connected to the pulley 241 and to the sheaths 724 which are mechanically locked outside the outer ring 230, by means of stop pieces 234. Thus, by means of the tendons 724', the link 24' can be turned about the axis $\Delta_{24}$ of the joint 24, thereby causing the forearm AB of the operator U to perform pronation or supination.

The need for a moving system that appears to be complex compared with the manifest simplicity of the elbow joint is explained below.

The human elbow joint C cannot be considered as being a pure hinge, insofar as the position of its axis oscillates while it is moving. Consequently, using an exoskeleton having a single common DOF for the purpose of imitating flexing of the elbow cannot lead to results that are accurate and gives rise to friction in the mechanism since the two axes of rotation never coincide.

Consequently it is necessary to add the two above-described additional passive joints, joint 22 and joint 23, having respective axes $\Delta_{22}$ and $\Delta_{23}$ and fitted with angle sensors (e.g. the linear sensor 218 for axis $\Delta_{22}$ and the angle sensor 226 for axis $\Delta_{23}$ in FIGS. 4C1 and 4C2).

The combined mechanism then enables accurate results to be obtained for flexing of the elbow C, even though the system departs considerably from the biological model.

Overall, the system establishes a moving reference structure over the human elbow C based on the upper arm BS and the end of the forearm AB. The human movements of the elbow C (flexion/extension and pronation/supination) can be detected and influenced without constricting the natural range of these movements. To provide a normal feedback torque to human flexing and to elbow rotation, only two actuators are needed, even though four moving axes are needed to allow unimpeded movement to the human arm during remote control.

The wrist subassembly 1 is described in greater detail below with reference to FIGS. 3A to 3H3.

FIG. 3A is a view of the palm of the wrist subassembly 1. This subassembly comprises six joint axes, all of the rotary type.

Figure 3B:
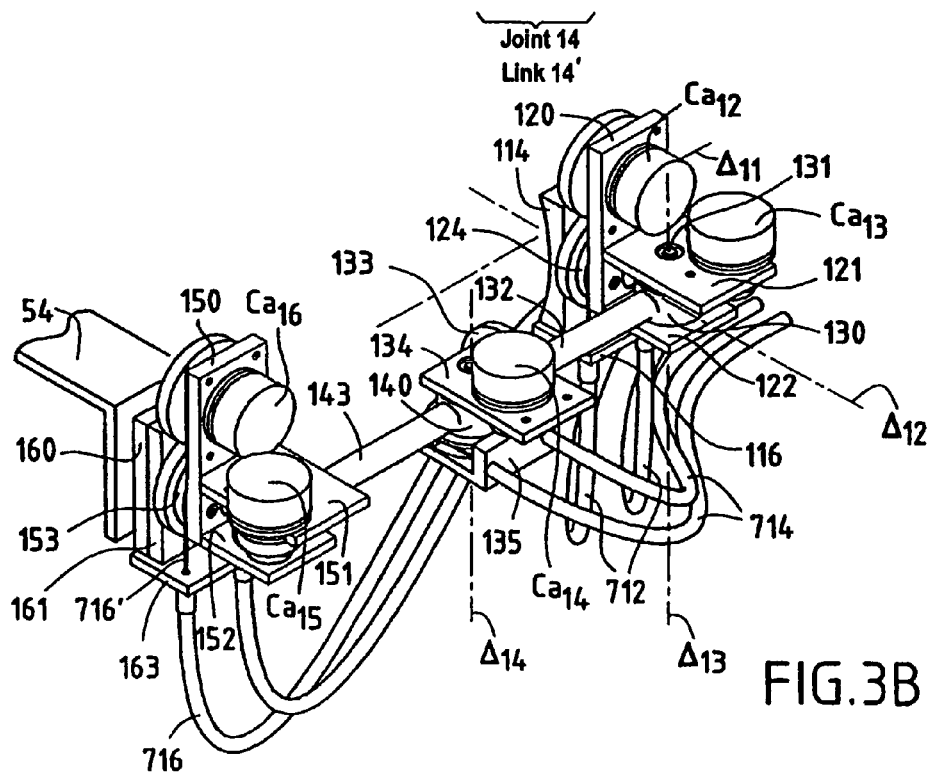
FIG. 3B is a diagram in three dimensions showing the various joints associated with the wrist subassembly of the FIG. 3A exoskeleton together with their axes of rotation.

FIG. 3B is an isometric view showing the relative positions of these six axes $\Delta_{11}$ to $\Delta_{16}$ in three dimensions for a particular posture of the hand M and the wrist P of the operator U, at a given instant.

FIGS. 3A and 3B are used as a reference for explaining the operation of the first joint of the wrist subassembly 1. FIGS. 3C1 to 3G3 show various other views of the mechanism separately. The corresponding joints are referenced joint 11 to joint 16.

The proximal end of the subassembly 1 is engaged on the forearm AB and is fixed thereto by an inflatable cushion 28 surrounded by a rigid annular piece 240 that is put on the forearm close to the hand. This rigid annular piece 240 is connected on its outside to the inside portion of an outer ring 110 by means of a ball bearing 111 of thin section, as can be seen more clearly in FIGS. 3H1 to 3H3. By means of the ball bearing 111, the outer ring 110 can turn about the axis $\Delta_{11}$ which is the axis of rotation of joint 11. In FIG. 3A, only the outer ring 110 and the inflated cushion 28 can be seen.

The link 11' is the child link of the joint 11, and it comprises the outer ring 110 and stop pieces 112 which are screwed to the ring 110 to constitute means for locking the sheaths 711 at their distal ends. The tendons 711' are threaded through these stop pieces 112 and through holes in the outer ring 110 at the end of a hollow pulley 113 which is attached to the fixed ring 240. Thus, by establishing relative movement between the tendons 711' and the sheaths 711, the outer ring 110, and consequently the link 11' as a whole, can be caused to turn about the axis $\Delta_{11}$ of the joint 11, as can be seen more particularly in the exploded view of the joints 11 and 24 of FIGS. 3H1 to 3H3. In FIG. 3A, the sheaths are not shown.

An additional member of the link 11' is a fixing connection 114 which is used for fixing a mechanical shaft 115 (best seen in FIGS. 3C1-3C3) orthogonally to the outer ring 110. In addition, a stop plate 116 is fixed beneath the fixing connection 114 to stop the distal ends of the spiral sheaths 712. The joint 12 causes the link 12' to move about the link 11' along the axis of rotation $\Delta_{12}$.

The section view of the joint 12 shown in FIG. 3C3 is used for describing the joint in greater detail. The shaft 115 carries a ball bearing 117 at its distal end, with a base plate 120 being fixed thereto on the outside surface of the bearing. This base plate 120 constitutes a reference for the link 12', to which all of the other portions of this link are connected. Thus, the pulley 124 is screwed to the base plate 120, thereby connecting the tendons 712' to the link 12'. The tendons 712' are threaded through the stop piece 116 of the preceding link and establish rotation of the link 12' as soon as relative movement between the tendons 712' and the sheaths 712 is induced by the motors acting on the tendons. In addition, two horizontal plates 121 and 122 are fixed to the base plate 120 by means of screws, as can be seen more particularly in FIGS. 3D1 to 3D3. These two plates carry respective ball bearings 124 and 123, and the shaft 131 of the joint 13 is held between them. The joint 13 connects the link 12' as parent link to the child link 13' which turns passively about the axis $\Delta_{13}$. The base of the link 13' is the shaft 131 which has a cylindrical piece 130 fixed thereto. This cylindrical piece 130 includes a stud orthogonal to its cylindrical surface and providing means for fixing a cylindrical bundle 132 at its proximal end. By rotation of the shaft 131, the entire link 13' turns about the axis $\Delta_{13}$ of the joint 13. The distal end of the cylindrical bundle 132 is fixed to a connection plate 133 which carries two horizontal plates, a top plate 134 and a bottom plate 135, as can be seen more particularly in FIGS. 3E1 to 3E3. The bottom plate 135 provides stop means for the distal ends of the sheaths 714. In a manner similar to the plates 121 and 122, the plates 134 and 135 carry ball bearings which hold and center the shaft 141 between the plates 134 and 135.

The joint 14 is an active joint causing the link 14' to turn about the link 13' along the ax is $\Delta_{14}$. The link 14' has another cylindrical portion 140 which is fixed to the shaft 141 and has a stud orthogonal to its cylindrical surface which fixes the proximal end of a second cylindrical bundle 143. A pulley 142 is also fixed to the cylindrical portion 140 to secure the tendons 714'. By creating relative movement between the tendons 714' and the sheaths 714, the shaft 141 is caused to move about the axis $\Delta_{14}$ of the joint 14. This movement of the shaft causes the entire link 14' to move about the link 13'.

The distal end of the cylindrical bundle 143 is held in another cylindrical portion 144 that is attached to a shaft 145.

This shaft 145 constitutes the mechanical hinge axis of passive joint 15 which connects link 14 to link 15 and in which link 15 turns as the child link about link 14 along axis $\Delta_{15}$, as shown more particularly in FIGS. 3F1 to 3F3, and in FIG. 3B. The shaft 145 is held between two ball bearings which are held by two horizontal plates, a top plate 151 and a bottom plate 152, these plates being screwed to the base plate 150 of the link 15'.

The distal end is fixed on a hard plastics glove 5 on the hand M of the operator U. In the example shown, the glove 5 is constituted by a main shell 50 having a first orifice 51 (on top in FIG. 3A) through which the thumb can extend and one or more (axial) orifices 52 allowing the other fingers of the hand M to pass.

The subassembly 1 is fixed to the shell 50 of the glove 5 by any appropriate means (screws, etc.) via a distal piece 54 associated with the axis $\Delta_{16}$ of the joint 16.

Joint 16 associates link 15' with the distal piece 54 enabling active rotation under the influence of tendons about the axis $\Delta_{16}$. The distal piece 54 is fixed to the back of the glove 5 in which the hand M of the operator U is inserted. The other side of this distal piece 54 is connected to a base plate 160 as can be seen more particularly in FIGS. 3G1 to 3G3.

This base plate 160 is held to a second plate 161 to fix a shaft 162 orthogonal to the surfaces of the pieces. This shaft 162 carries a ball bearing 167 at its distal end, with the base plate 150 of the link 15' being attached thereto. A pulley 153 which is directly mounted on the base plate 150 fixes the tendons 716 coming from the sheaths 716. Since the sheaths 716 are fixed at their distal ends to a stop plate 163, which is attached to the base plate of the link 16', any relative movement of the tendons 716' against the sheaths 716 causes the link 16' to turn about the axis $\Delta_{16}$ relative to the link 15'.

To sum up, the mobility of the wrist subassembly can be described as follows:

The three joints joint 13 to joint 15 of axes $\Delta_{13}$ to $\Delta_{15}$ are joints of rotary type. The joints 13 and 15 of axes $\Delta_{13}$ and $\Delta_{15}$ are purely passive, while the joint 14 of $\Delta_{14}$ is active and controlled by pairs of flexible tendons of the bundle 7, these tendons being referenced 714'. The passive joints are included in the subassembly 1 so as to ensure that the human wrist P can be moved without being hindered during operations of remotely controlling the robot (not shown).

With the structure of the human skeleton and the attachment points on the body of the human operator U on two sides, the mechanism constitutes a pantograph. Abduction or adduction of the wrist P can be controlled by actuating the joint 14 of axis $\Delta_{14}$ and passive movements then result in the passive joints. If the tendons 714' actuate the joint 14 towards small angles, then abduction is imposed on the joint of the wrist P. When the tendons 714' cause the joint 14 to move towards large angles, then adduction is imposed on the joint of the wrist P.

To understand how torque is exerted in order to flex the wrist P, reference is made to the isometric view shown in FIG. 3B.

The joints 12 and 16 of axes $\Delta_{12}$ and $\Delta_{16}$ are both of the active type. They are used for detecting and for imposing flexing movement to the wrist P. For example, if both joints turn clockwise, then the links of the exoskeleton joints cause the human wrist P to flex upwards, and conversely if they are operated in the counterclockwise direction then they impose downward flexing. If both joints are prevented from moving, then the wrist is prevented from flexing.

To obtain these movements, the joints 12 and 16 are controlled by respective pairs of flexible tendons 712' and 716'.

Since the human wrist P is an ellipsoid joint and not a spherical joint, these five links on their own cannot provide optimum performance of the mechanism during circumduction or any other combined movement. Consequently, the joint 11 is included in the moving system. The joint 11 of axis $\Delta_{11}$ is another joint of rotary type and it is active, being capable of compensating the eccentricity in any combined movement. It is controlled by a pair of flexible tendons 711'.

Advantageously, all of the joints of the subassembly 1 are associated with respective sensors $Ca_{12}$ to $Ca_{16}$ (FIG. 3B) which measure angles of rotation about the corresponding axes $\Delta_{11}$ to $\Delta_{16}$. The data that results from these measurements is transmitted by any appropriate means to receiver systems, e.g. located in the space station, or directly in the pack 6 (FIG. 1B). This transmission can take place over wires or it can on the contrary be wireless (radio transmission, etc.). In themselves, these aspects are well known to the person skilled in the art and there is no need to describe them in greater detail herein.

It results from the above dispositions that the subassembly 1 allows the wrist P to move freely without in any way restricting the movements of the operator U.

There follows a more detailed description of the operation of the unit for controlling the active joints.

As mentioned above, one of the important characteristics of the invention is that the torque for driving the active joints is transmitted remotely by using tendon cables 7 guided along the structure of the exoskeleton EXB and coming from motors Mt placed on the back plate 42 for the torso, being transmitted to each of the actuated joints. Installing the motors behind the user U serves to minimize the size and the weight of the exoskeleton master arm EXB.

In a practical embodiment, it is advantageous for the tendons of the bundle 7 to be constituted by multistrand cables, typically 7×19 cables having a diameter of 1 millimeter (mm). This choice serves to minimize friction in curves and can deliver loads of up to 50 newton-meters (Nm). To transfer torque effectively by using a transmission with cable tendons, the cables need to be subjected to forces in such a manner as to be pre-tensioned to half their operating load, i.e. 25 Nm in this example.

FIGS. 6A, 6B, and 6C are diagrams showing how a pair of cable tendons arbitrarily referenced 700' actuate one of the active joints, of axis arbitrarily referenced $\Delta$.

A pulley R arbitrarily referenced on the axis $\Delta$ is turned about the axis by a loop constituted by a pair of tendons 700'. The shaft of the pulley R is secured to a first piece which is assumed to be stationary and is arbitrarily referenced $A_1$. A second piece which is assumed to be moving is arbitrarily referenced $A_2$ and is turned about the axis $\Delta$ by the pulley R.

In FIG. 6A, the two pieces $A_1$ and $A_2$ are shown as being in line one with the other: this state is referenced I. If torque is imparted to the pulley R (in the counterclockwise direction in the example: arrow f), via the pair of tendons 700', it is caused to turn about the axis Δ and the piece $A_2$ follows this turning movement; this state is referenced II (FIG. 6B). The moving piece, now referenced $A'_2$ is in a position orthogonal to the piece $A_1$.

Naturally, applying torque in the opposite direction (clockwise) returns the moving piece to its first state $A_2$ (FIG. 6A).

The tendons 700' are guided over the exoskeleton EXB (FIG. 1A) by sheaths in which they slide and which are arbitrarily referenced 700. Guidance length can be modified as a function of the length of the tendon 700'.

FIG. 6C shows in greater detail the mechanical units included along the path of a tendon going from a motor and terminating with an actuated joint. FIG. 6C represents the general case of actuating rotary joints.

The tendons 700' which are fixed to the pulleys R (via a stop plate BA), as described above, are guided along spiral sheaths 700 until they reach a pre-loading unit 8 which is used for stretching the tendons 700' by means of their sheaths and thus establishing pre-loading. This can be done by shortening the length of the tendons relative to the sheaths by turning the pre-loading screws $C_1$ in the counterclockwise direction. This pre-tensioning system presents the advantage that the actuation unit need not be fixed to the same reference structure as the pre-loading unit, and can thus be moved in three dimensions relative to the pre-loading unit without losing tension or leading to involuntary modification of the position of an axis that has turned.

Passing through the pre-loading unit 8, the tendons 700' are guided by a sheath 700 leading to a motor unit (motor Mt). The motor unit Mt has a pulley ME which is secured to the shaft $Δ_m$ the motor Mt. either directly or via a speed-changing member. The motor Mt is itself fixed to a piece referenced D which is also used for stopping the proximal ends 700bII of the sheaths. The tendons 700' pass through this reference piece D and wind around the pulley ME to which they are fixed.

Thus, in order to actuate the actuation unit, the motor Mt needs to drive the pulley ME in the same direction as the movement desired for the actuated joint.

It will readily be understood that the joint control member described above is repeated for all of the above-described active joints.

A special case concerning linear actuation is explained with reference to FIG. 6D which is a diagram showing linear actuation of the common sliding joint 33.

The function of the initial pre-loading unit is identical to the function described above with reference to FIG. 6C. The main difference lies in the actuation unit. The linear joint is actuated by a single tendon 700' which is threaded along the center of telescopic tubes F. The tubes F are secured at the distal end to a stop plate H where the distal end of the tendon 700' is fixed. At the proximal end of the telescopic tubes F, there is another stop plate G which prevents the distal end of the sheath 700 from passing inside the telescopic tubes F. The tendon 700' can pass through the plate G and reaches the inside of the sheath 700 immediately after leaving the proximal end of the telescopic tubes F. Between the two stop plates G and H, a compression spring establishes repulsion force.

After passing through the pre-loading unit, the tendons 700' and the sheath 700 reach the motor unit. This motor unit includes a reference plate K on which the motor Mt is fixed and to which the proximal end 700bII of the sheath 700 against which comes into abutment. The tendon 700' passes through the plate K and is fixed to a pulley J. The pulley J guides the tendon along a spiral path, i.e. a path of varying radius. By means of this special shape for the pulley, it is possible to eliminate the non-linear behavior due to the increasing compression force of the spring. This makes the motor easier to control.

If the motor Mt pulls the tendon 700', the plate H of the actuation unit begins to press against the compression spring SP. The telescopic tubes F contract as a whole. Releasing the tendon 700' in the opposite direction allows the pulley J to cause the telescopic tubes F to lengthen.

There follows a more detailed description of how the various portions of the arm exoskeleton EXB of the invention are fitted to an operator U, with reference again to FIGS. 1A and 1B, and also to FIGS. 7A and 7B.

The entire exoskeleton EXB is attached to the torso TH of an operator U. Two rigid plates 40 and 41 provide a rigid reference structure for the exoskeleton EXB. The two plates 40 and 41 are attached together about the human torso TH by means of straps 42 which are advantageously of self-fastening cloth. The exoskeleton master arm is screwed onto the front plate via the fixing piece 38 (FIGS. 5A and 5B) and it consequently uses the human torso TH as its reference.

Concerning the fixings on the upper arm BS and the forearm AB, inflatable annular cushions are used, as mentioned above.

FIGS. 7A and 7B are sagittal sections of the inflatable annular cushions respectively of the shoulder subassembly 3 (cushion 30), and of the elbow and wrist subassemblies 1 and 2 (cushion 28), as also shown in FIG. 2.

The inflatable annular cushions 30 and 28 are inserted in two respective outer rigid rings 31 and 240. Advantageously, these inflatable annular cushions can be made of silicone rubber and can be inflated using pumps which are disconnectable via quick couplings. Once inflated, the rings establish a non-sliding connection between the human arm BS, or AB, and the outer rigid rings. The outer rigid rings constitute fixing points for the elbow assembly.

In order to reduce friction at each joint, and as a result in order to increase the efficiency of the system overall, each axis is advantageously fitted with ball bearings, for example the ball bearings referenced 242 in FIG. 7B. As a result, the mechanisms follow each human movement of the upper arm BS, of the forearm AB, and of the wrist P, without impeding it.

In a practical embodiment of the arm exoskeleton EXB (FIG. 1A) of the invention, the exoskeleton is designed to be as lightweight and as rigid as possible. To do this, most of its parts are made advantageously out of an aluminum-based alloy, and wherever possible using parts made of plastics material (e.g. polyvinyl chloride PVC). The large structural parts for enclosing the arm Bd (or Bg) of the operator U are advantageously based on carbon fiber composite materials in order to reduce weight, while simultaneously increasing the stiffness of the rigid structure of the exoskeleton EXB.

The last interface with the human arm Bd (or Bg) is the distal end attachment of the exoskeleton to the palm of the operator U (see FIG. 3A, for example). As described above, the operator U wears a rigid glove 5 over the palm having openings 51 and 52 and fixed to the palm with self-fastening cloth 53. The use of such an interface enables all of the fingers of the operator U to be left free. Consequently, an additional interface of the haptic type can be used: for example a "cyber glove" or a "cyber grip".

On reading the above, it will readily be understood that the invention achieves the objects it set out to achieve.

The arm exoskeleton in accordance with the invention provides numerous advantages as mentioned above which it is pointless to repeat.

This is due firstly to the original design of its moving parts which make no attempt to imitate the movements of the human arm. This is also due to using cable tendons for actuating the active joints. Finally, this is due to using inflatable cushions which make the exoskeleton highly adaptable without requiring lengthy and difficult adjustments: adjusting two screw or similar members situated in the telescopic tubes typically suffices when fitting the arm exoskeleton on site to a large percentage of subjects (typically within the above-mentioned percentile range).

Nevertheless, it should be clear that the invention is not limited solely to the embodiments specifically described, in particular with reference to FIGS. 1A to 7B.

Similarly, the invention is described only in the context of its preferred application, i.e. remotely controlling a humanoid type robot working outside a space station, but it is clear that the invention is not limited in anyway to that application.

On the contrary, the invention is applicable in numerous domains, and in non-exhaustive manner, in the following domains:
- very precise remote control of real or virtual robots for nuclear operations, for offshore type operations, for mine clearance, for handling dangerous materials, for biological decontamination work, etc.;
- physiotherapy for people suffering from temporary damage to the arm: the exoskeleton is used for passive gymnastics;
- actuating passive prostheses for handicapped people, commands being given by voice or by transmitting nerve impulses;
- entertainment combined with physical fitness training: when associated with video goggles, the exoskeleton can deliver a set of physical training exercises to the arm;
- physical fitness training for astronauts in orbit, or on long duration missions: this use is similar to that outlined above, but with the more specific purpose of combating bone and muscle wasting;
- increasing the strength of people suffering from muscular deficiency;
- realistic animation of virtual characters in the TV and/or motion picture industries: the movement of the arm of a virtual character follows that of the animator, providing behavior that is very natural and not jerky;
- "total immersion" video games;
- training industrial robots, for example for high precision tasks and for tasks at a small scale, such as using robots to assemble microelectromechanical systems (MEMS) or micronanotechnology (MNT); and
- training astronauts in a virtual environment.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein.

What is claimed is:

1. An arm exoskeleton for acquiring data representative of the movements of arm joints of a human body and/or exerting torques to said arm joints, the exoskeleton comprising a sleeve for wearing on at least one arm of a human person so as to provide a moving system of exoskeleton joints, said sleeve comprising a first subassembly "shoulder exoskeleton" having at least six exoskeleton joints associated with a shoulder joint of said human body, a second subassembly "elbow exoskeleton" comprising at least four exoskeleton joints associated with an elbow joint of said human body, and a third subassembly "wrist exoskeleton" comprising at least six exoskeleton joints associated with a wrist joint of said human body, and actuating units for controlling said first, second and third subassemblies, such that said first, second and third subassemblies are mechanically dissociated so as to be capable of being controlled individually by said actuating units.

2. An exoskeleton according to claim 1, wherein said wrist exoskeleton includes a distal end securable to a hand of a person.

3. An exoskeleton according to claim 2, wherein said actuating units comprise flexible tendons comprising cables threaded in spiral-type guide sheaths, and wherein motor-driven control units are placed on a back plate for actuating said flexible tendons.

4. An exoskeleton according to claim 3, wherein the first, second and third determined number of joints is equal to sixteen, thereby providing sixteen degrees of freedom, respectively.

5. An exoskeleton according to claim 4, wherein said shoulder exoskeleton comprises six joints, each associated with a respective axis, and wherein first, second, fourth, fifth, and sixth of said six joints are rotary and said third joint of said six joints is sliding.

6. An exoskeleton according to claim 5, wherein said shoulder exoskeleton includes a first member affixed to a chest plate and associated with the first and second rotary joints.

7. An exoskeleton according to claim 6, wherein said shoulder exoskeleton includes a second member fitted with an inflatable cushion engaged on an upper portion of said at least one arm so as to secure said arm to said shoulder exoskeleton, a clamp, said clamp comprising an annular member disposed between the ends of a U-shaped piece, and wherein said ends are associated with said fifth rotary joint.

8. An exoskeleton according to claim 7, wherein said shoulder exoskeleton includes a third member having a telescopic tube surrounded by a pre-tensioning spring, said third member being fixed by a first end free to rotate about the axis of said second joint to said first member and by a second end to a point on the base of said U-shape, said fixing point establishing the fourth rotary joint, said third member forming said sliding joint, and wherein said spring is actuated by one of said flexible tendons exerting a force thereon so as to compress or extend the spring depending on the direction of said exerted force.

9. An exoskeleton according to claim 5, wherein said first, second, and sixth rotary joints are "active", being actuated by said actuating units, and wherein said fourth and fifth rotary joints are "passive", not being actuated by any of said actuating units.

10. An exoskeleton according to claim 4, wherein said elbow exoskeleton comprises four joints, each associated with a respective axis, and wherein said first, third, and fourth joints are rotary and said second joint is sliding.

11. An exoskeleton according to claim 10, wherein said elbow exoskeleton includes a first member comprising an angularly shaped first piece and a horseshoe-shaped second piece secured to each other by telescopic tubes adjustable in length, a screw device for adjusting the length of said tubes and said first piece and at least one second piece adapted to be worn above the elbow of an operator on the upper portion of an arm of the operator.

12. An exoskeleton according to claim 11, wherein said elbow exoskeleton includes a second member comprising a horseshoe-shaped third piece connected to said horseshoe-shaped second piece via an intermediate piece, said third piece adapted to be worn below the elbow of the operator on the forearm portion of the arm of the operator.

13. An exoskeleton according to claim 5, wherein said first and fourth rotary joints are "active", adapted to be actuated by said actuating units, wherein said second and third joints are of the rotary type and are "passive", not being actuated by any of said actuating units, and wherein said third joint is of the sliding type and "passive", not being actuated by any of said actuating units.

14. An exoskeleton according to claim 4, wherein said wrist exoskeleton comprises six rotary joints, each associated with a respective axis of rotation.

15. An exoskeleton according to claim 14, wherein the wrist exoskeleton includes a first member associated with a first rotary joint and having an inflatable cushion adapted to be worn on a forearm of said operator close to the hand of the operator, so as to prevent said exoskeleton from moving relative to the wrist, said inflatable cushion being secured in an annular piece.

16. An exoskeleton according to claim 15, wherein the wrist exoskeleton includes a rigid glove adapted to receive an operator's hand by insertion in the rigid glove, said wrist exoskeleton includes a second member comprising a fixing piece for said rigid glove.

17. An exoskeleton according to claim 16, wherein said rigid glove has openings for fingers of said hand, and said fixing piece being constituted by a self-fastening cloth.

18. An exoskeleton according to claim 16, wherein said wrist exoskeleton includes a third member forming a hinged mechanical connection device between said first and second members, wherein said hinged connection device includes a fixing piece on said annular piece, said fixing piece being associated with said second rotary joint, and first and second connection rods hinged at a first end about an intermediate piece associated with said fourth rotary joint, wherein said first rod is secured at a second end to said fixing piece on said annular piece, to turn freely about an axis associated with said third joint, wherein said second end is connected to said fixing piece on said rigid glove to turn freely about an axis associated with said fifth joint, and wherein said fixing piece for said rigid glove is also associated with fifth and sixth rotary joints.

19. An exoskeleton according to claim 14, wherein said first, second, fourth, and sixth rotary joints are "active", being actuated by said actuating joints.

20. An exoskeleton according to claim 9, wherein said active joints include pulleys for driving rotary shafts coinciding with axes of said joints, and wherein a number of said cables are arranged to drive said pulleys in either the clockwise direction or the counterclockwise direction so as to impart corresponding turning movement to the joint associated with said pulley.

21. An exoskeleton according to claim 3, including pre-tensioning members disposed on said shoulder exoskeleton for subjecting said flexible tendons to an initial force of pre-determined amplitude, constituting a fraction of the maximum load to be supported.

22. An exoskeleton according to claim 21, wherein said pre-tensioning members comprise clamping and unclamping screws adapted to act on ends of said cable guide sheaths.

23. An exoskeleton according to claim 3, wherein said control units actuating said flexible tendons are DC motors disposed on a back plate.

24. An exoskeleton according to claim 4, further including angle sensors fitted to said joints for measuring turning of the axes associated with said joints.

25. An exoskeleton according to claim 2, further including self-fastening straps of cloth for attaching chest and back plates of a support of the exoskeleton to each other.

26. A shoulder exoskeleton adapted to be worn on a shoulder of a human person, said shoulder exoskeleton having a moving system comprising at least six exoskeleton joints and six degrees of freedom thereby adapted to provide a full range of movements of a shoulder of a human person.

* * * * *

UNITED STATES PATENT AND TRADEMARK OFFICE
CERTIFICATE OF CORRECTION

| | |
|---|---|
| PATENT NO. | : 7,410,338 B2 |
| APPLICATION NO. | : 10/443111 |
| DATED | : August 12, 2008 |
| INVENTOR(S) | : Andre Schiele and Gianfranco Visentin |

It is certified that error appears in the above-identified patent and that said Letters Patent is hereby corrected as shown below:

(57) Abstract

Line 3 - Replace "the" human arm with "a" human arm.

Line 10 - Replace "exoskeleton, and the wrist" with "exoskeleton. The wrist".

Line 13 - Replace "exoskeleton, said tendons themselves being actuated" with "exoskeleton. The flexible tendons are actuated".

Signed and Sealed this

Tenth Day of February, 2009

JOHN DOLL
*Acting Director of the United States Patent and Trademark Office*